United States Patent
Kusakabe et al.

(10) Patent No.: US 11,850,781 B2
(45) Date of Patent: Dec. 26, 2023

(54) INJECTION MOLDING INFORMATION MANAGEMENT SUPPORT DEVICE AND INJECTION MOLDING MACHINE

(71) Applicant: FANUC CORPORATION, Yamanashi (JP)

(72) Inventors: Hironori Kusakabe, Yamanashi (JP); Junpei Maruyama, Yamanashi (JP); Masaya Tajika, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 748 days.

(21) Appl. No.: 17/010,234

(22) Filed: Sep. 2, 2020

(65) Prior Publication Data

US 2021/0107194 A1 Apr. 15, 2021

(30) Foreign Application Priority Data

Oct. 10, 2019 (JP) .................................. 2019-187069

(51) Int. Cl.
| | | |
|---|---|---|
| B29C 45/76 | (2006.01) | |
| B29C 45/77 | (2006.01) | |
| B29C 45/78 | (2006.01) | |
| G05B 19/4155 | (2006.01) | |

(52) U.S. Cl.
CPC ........ *B29C 45/766* (2013.01); *B29C 45/7653* (2013.01); *B29C 45/77* (2013.01); *B29C 45/78* (2013.01); *G05B 19/4155* (2013.01); *B29C 2945/76498* (2013.01); *B29C 2945/76505* (2013.01); *B29C 2945/76531* (2013.01); *B29C 2945/76551* (2013.01); *B29C 2945/76936* (2013.01); *B29C 2945/76943* (2013.01); *G05B 2219/45244* (2013.01)

(58) Field of Classification Search
None
See application file for complete search history.

(56) References Cited

U.S. PATENT DOCUMENTS

| | | | | |
|---|---|---|---|---|
| 5,494,623 | A * | 2/1996 | Miyahara | ................ B29C 45/76 425/169 |
| 2004/0148136 | A1 * | 7/2004 | Sasaki | ................ G05B 19/4065 702/184 |
| 2015/0099026 | A1 * | 4/2015 | Shiraishi | ................ B29C 45/77 425/170 |

FOREIGN PATENT DOCUMENTS

| | | |
|---|---|---|
| JP | 6-285940 | 10/1994 |
| JP | 2001-9888 | 1/2001 |
| JP | 2004-148593 | 5/2004 |
| JP | 2007-196390 | 8/2007 |

(Continued)

*Primary Examiner* — Ryan A Jarrett
(74) *Attorney, Agent, or Firm* — Wenderoth, Lind & Ponack, L.L.P.

(57) ABSTRACT

To easily check a changing trend of machine state data on an injection molding machine during a predetermined period and/or in every predetermined period. An injection molding information management support device for managing machine state data regarding a machine state in operation of an injection molding machine during a predetermined period and/or in every predetermined period includes a machine state data acquisition unit that acquires a machine state data value for each molding cycle in the injection molding machine, and a frequency distribution data recording unit that converts the machine state data value into a preset class data value and records the class data value in a storage unit.

12 Claims, 12 Drawing Sheets

(56) References Cited

FOREIGN PATENT DOCUMENTS

| JP | 2009-140449 | 6/2009 |
|----|-------------|--------|
| JP | 2015-74102 | 4/2015 |
| JP | 5811035 | 11/2015 |

\* cited by examiner

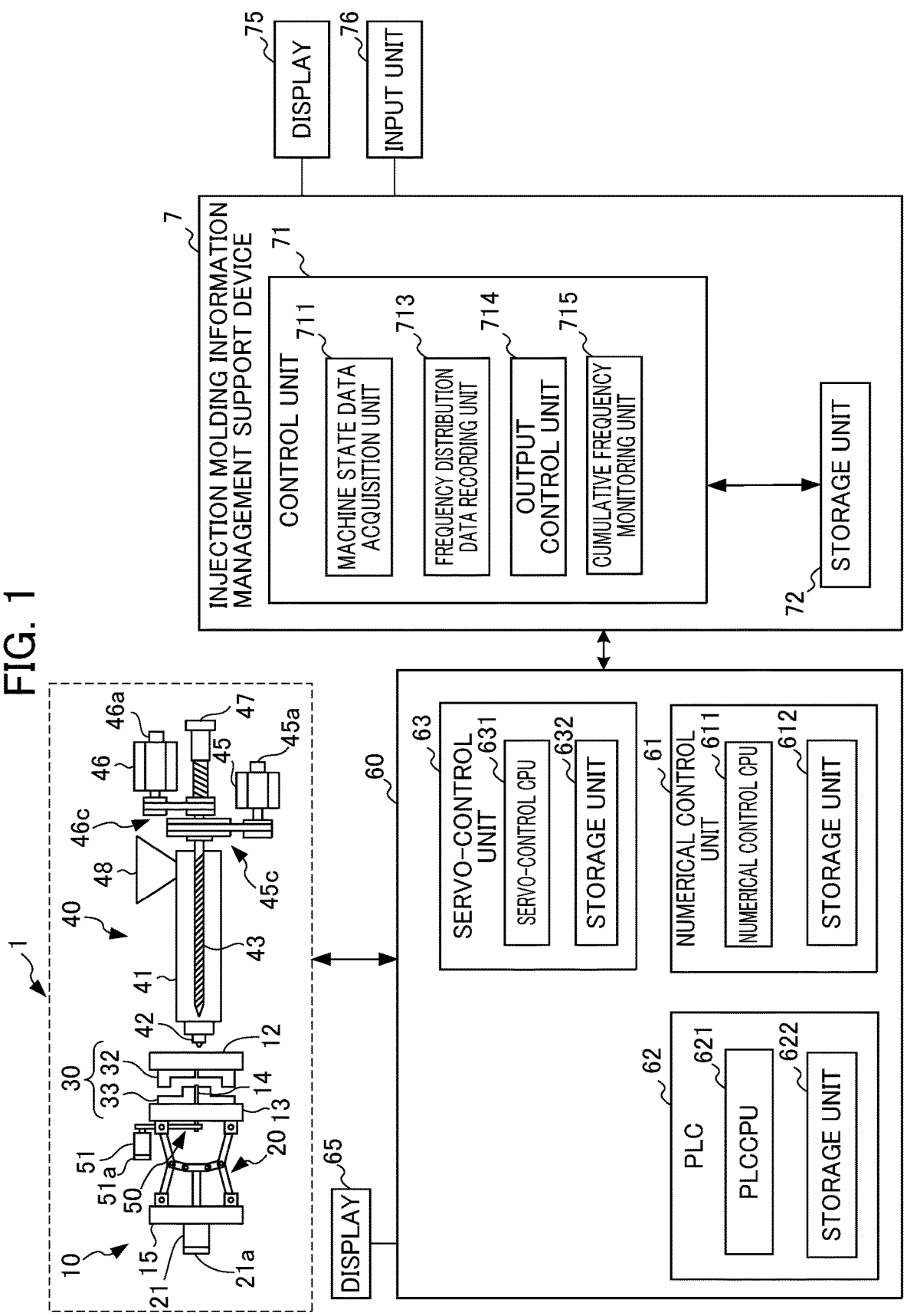

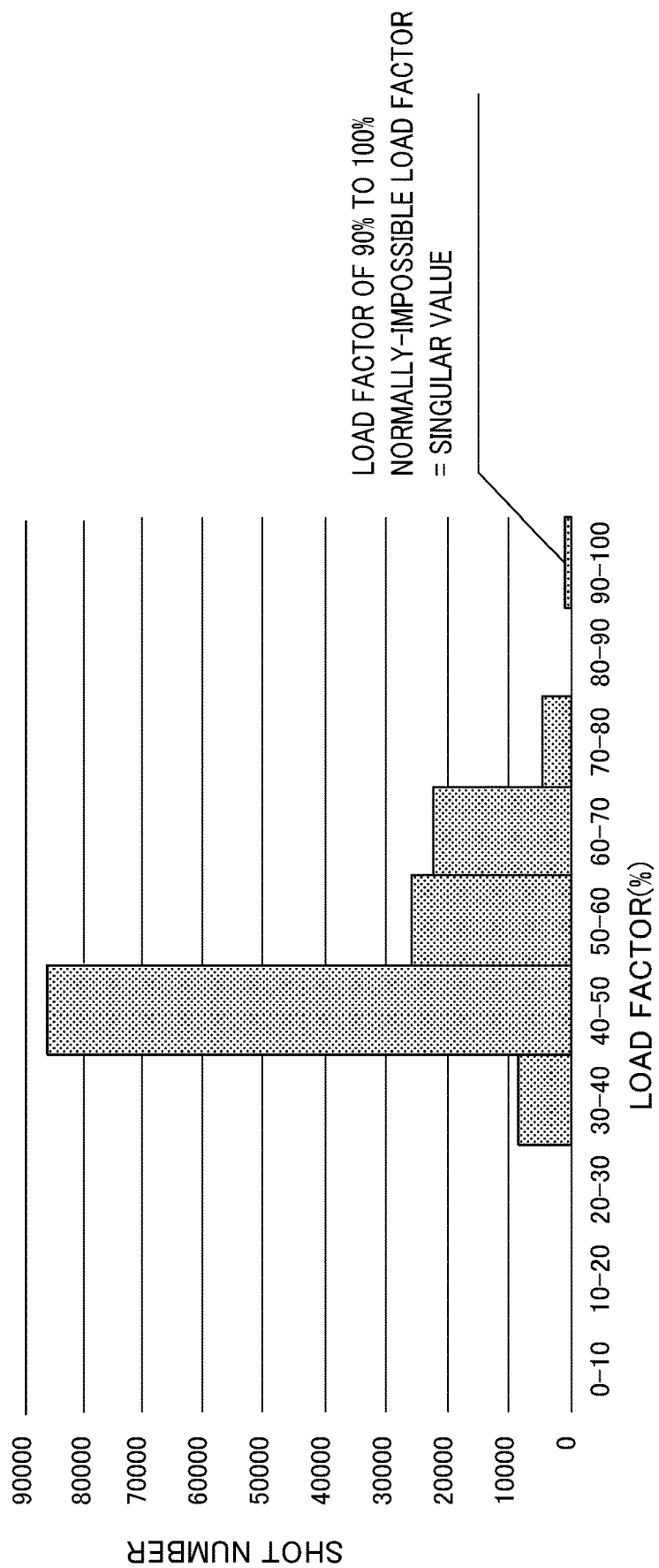

0 TO 50,000 SHOTS IN TOTAL 50,000 TO 100,000 SHOTS IN TOTAL 100,000 TO 150,000 SHOTS IN TOTAL

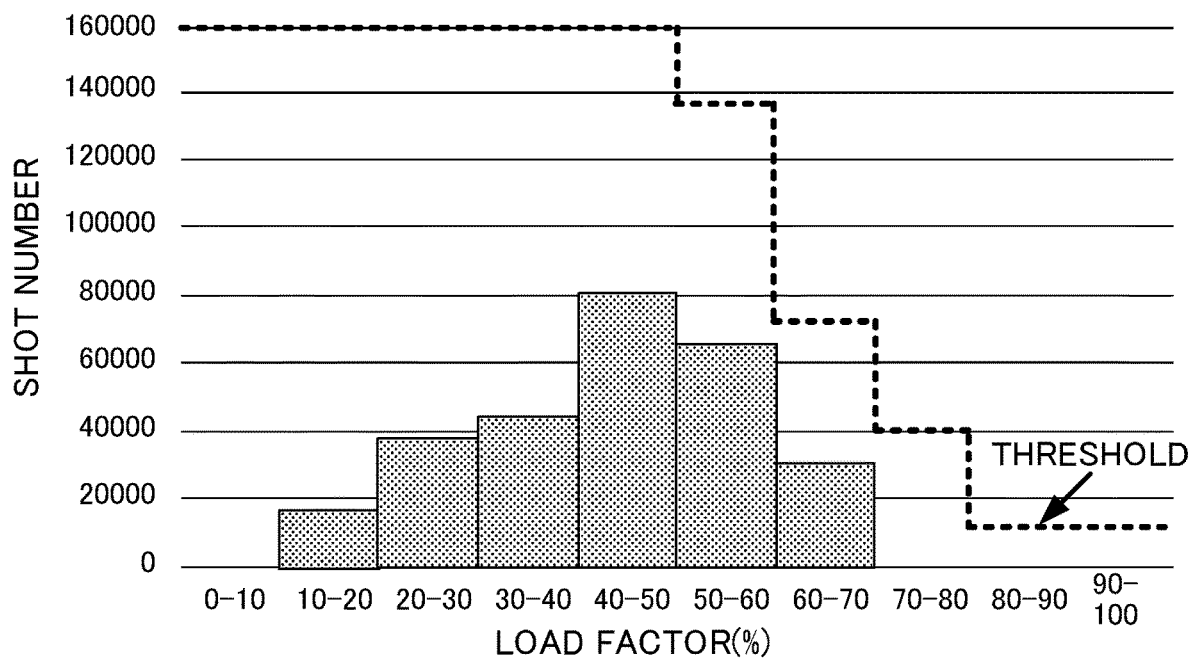

FIG. 12A
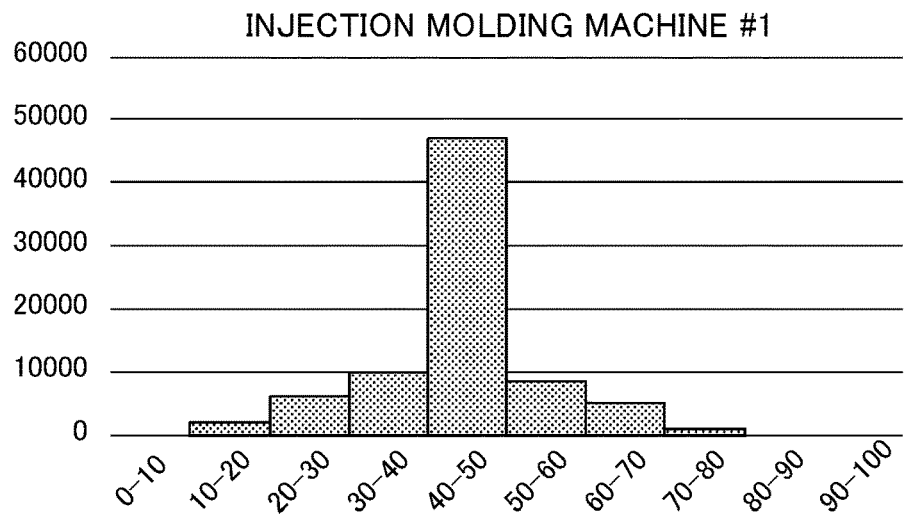
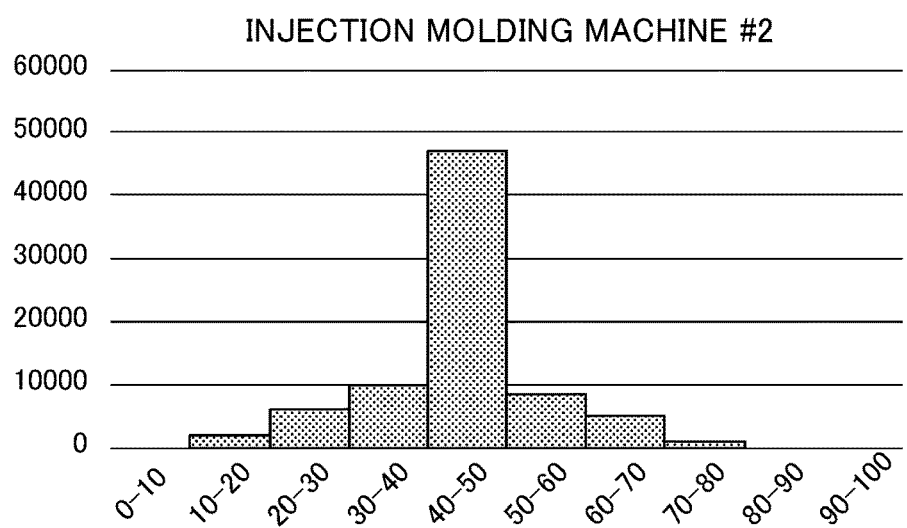
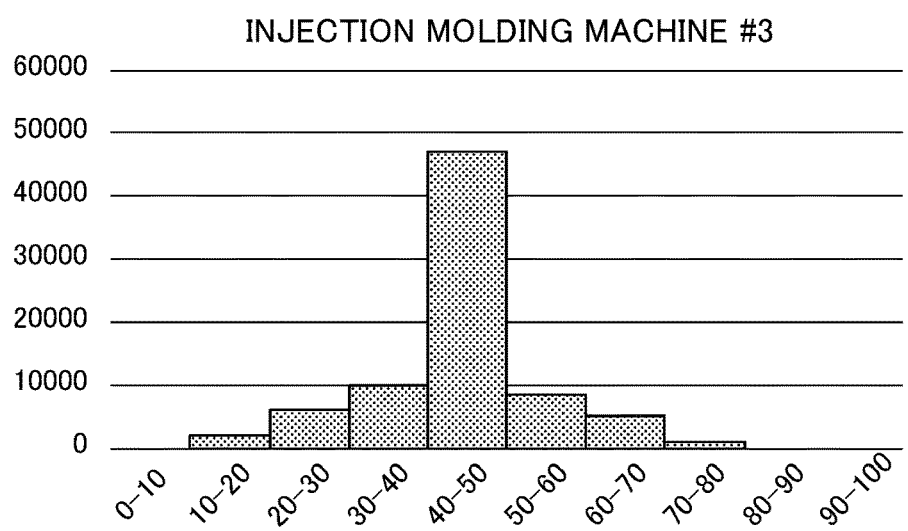

FIG. 12B
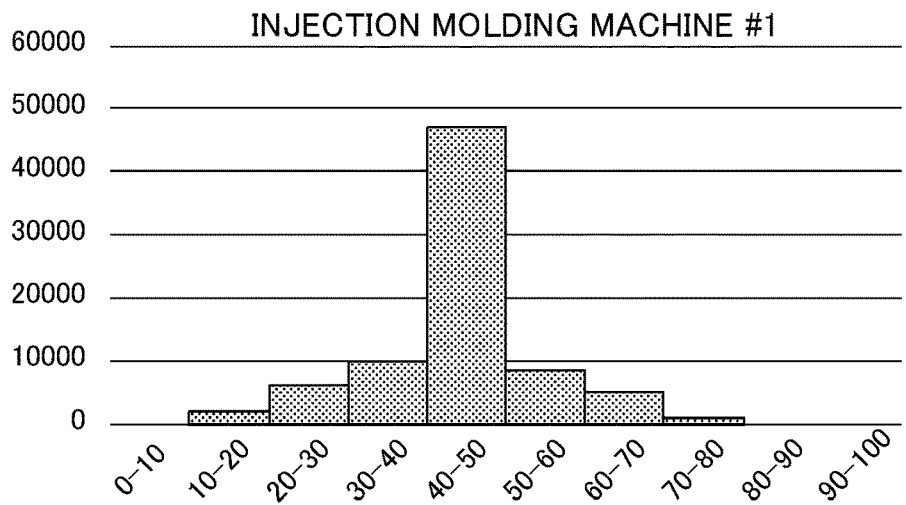
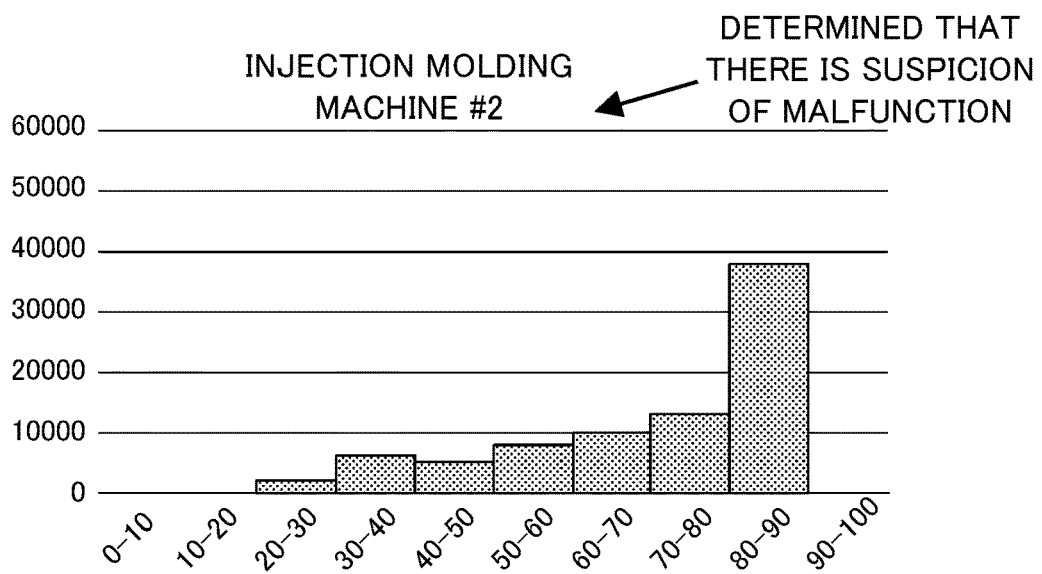
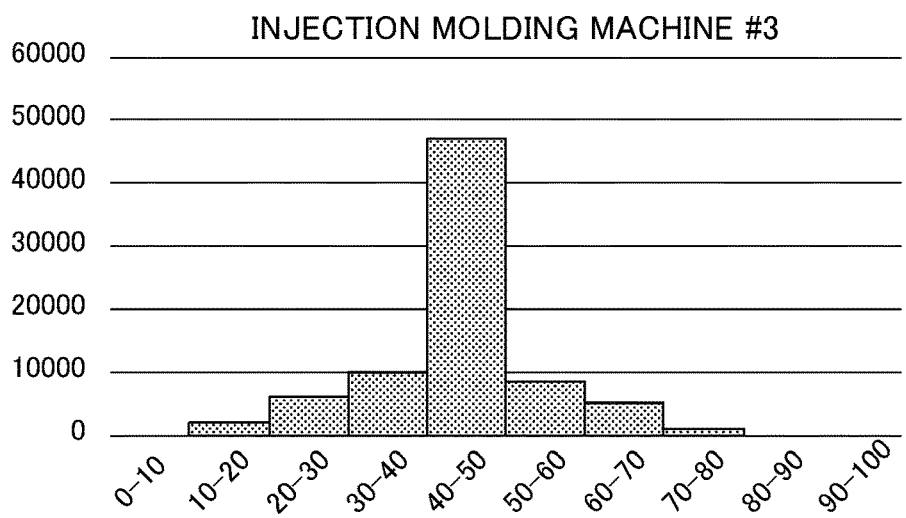

INJECTION MOLDING INFORMATION MANAGEMENT SUPPORT DEVICE AND INJECTION MOLDING MACHINE

This application is based on and claims the benefit of priority from Japanese Patent Application No. 2019-187069, filed on 10 Oct. 2019, the content of which is incorporated herein by reference.

BACKGROUND OF THE INVENTION

Field of the Invention

The present invention relates to an injection molding information management support device and an injection molding machine that facilitate checking of a changing trend of machine state data regarding a machine state in operation of the injection molding machine during a predetermined period and/or in every predetermined period according to frequency distribution.

Related Art

In an injection molding machine, it is important in production of a favorable molded article to perform monitoring such as monitoring whether or not a molding state is favorably maintained during molding operation and whether or not abnormality has been caused during the molding operation. For this reason, during one cycle in the injection molding machine, data is acquired in every predetermined sampling time from each sensor and each motor placed in the injection molding machine, and from such data, e.g., the maximum value and resin injection time are calculated/measured. Such calculated/measured data is utilized for, e.g., monitoring the molding state and determining the propriety of the molded article. For example, for each injection molding machine, values of various types of data indicating a molding operation state in each molding cycle, such as molding cycle time, injection time, measurement time, the temperatures of the motor, etc., a peak pressure, the load factors of the motor, etc., are measured.

For example, Japanese Patent No. 5811035 discloses an electric injection molding machine that displays, on a display unit, a load status of a drive unit that drives the electric injection molding machine across multiple cycles. The electric injection molding machine obtains the load factor of the drive unit every time one cycle is executed, and on the display unit, displays a load factor trend showing a change in the load factor obtained across the multiple cycles. Specifically, an injection molding machine 10 includes an injection servomotor 15a that moves a screw 13, which is provided in a nozzle 12, back and forth, a measuring servomotor 15b that rotates the screw 13 to measure a resin amount, an ejector servomotor 15c that moves an eject pin 14 to eject a molded article out of a mold 11, a clamping servomotor 15d that clamps the mold 11, and sensors 16a to 16d that detect the temperature of heat generated from each of the servomotors 15a to 15d to transmit information regarding the detected temperature to a controller 30. The injection molding machine 10 calculates the load factor of each of the servomotors 15a to 15d every time one cycle (a clamping step, an injection step (also including forward and backward movement of the nozzle), a measurement step, a mold opening step, an ejection step, and a standby step) for forming one molded article is executed. The injection molding machine 10 displays, on a display unit (an overload trend display area 42), a change in the load factors of the servomotors 15a to 15d obtained across multiple cycles. With this configuration, the electric injection molding machine disclosed in Japanese Patent No. 5811035 displays, on the display unit, the load status based on the change in the load factor obtained across the multiple cycles, and therefore, can predict the load status. If a user determines, from such a trend, that there is a probability that, e.g., seizure (overheat) of the servomotors 15a to 15d is caused, a molding condition is, for example, changed so that the drive unit can be protected from overload and a reduction in the number of molded article produced can be suppressed.

Japanese Unexamined Patent Application, Publication No. 2004-148593 discloses an electric injection molding machine including a multi-cycle average load factor calculation section that measures the torque of each servomotor included in the electric injection molding machine during one cycle of a molding step to calculate the load factor of each servomotor during one cycle of the molding step and average the motor load factors during one cycle of the molding step multiple times to calculate the average load factor of each motor across multiple cycles, and a display unit that displays the average load factor, which is calculated by the multi-cycle average load factor calculation section, of each motor across the multiple cycles. Japanese Unexamined Patent Application, Publication No. 2004-148593 describes that the average load factor of each motor across the multiple cycles is calculated in such a manner that the motor load factors of each motor during one cycle of the molding step are averaged multiple times, and therefore, variation in the motor load factor of each motor can be eliminated and the average load factor of each motor can be reliably visually checked.

Patent Document 1: Japanese Patent No. 5811035
Patent Document 2: Japanese Unexamined Patent Application, Publication No. 2004-148593

SUMMARY OF THE INVENTION

In many cases, time necessary for one cycle (one shot) in the injection molding machine is short, and the injection molding machine performs molding regardless of whether or not it is a weekend. For example, after shipment, it is assumed that the injection molding machine performs about 20,000,000 shots in molding before being discarded. For example, in this case, in a case where all pieces of data for each cycle are saved, such as a case where an ejector axis motor load factor is saved to two decimal places, the possible maximum data value is 10,000, and two bytes are necessary for storage. Thus, if all pieces of load factor data for 20,000,000 shots are stored, 40,000,000 bytes (40 MB) are necessary. An actual molding machine acquires, for each shot, many pieces of data such as each axis motor load, each heater temperature, packing time, a measurement position, and power consumption. For this reason, if there are 80 types of acquired data, a total memory amount necessary for storage is 40 MB×80=3.2 GB for saving all of 80 types of cycle data for 20,000,000 shots. However, a general injection molding machine lacks a memory capacity. Thus, it is not realistic that all pieces of operation data are saved. Basically, as long as the molding condition is not changed in the injection molding machine for which high stability of repeated operation is required, an operation data value is constant to a certain extent. Thus, there has been demand for the injection molding machine in which a changing trend (e.g., a long-term changing trend of molding information in operation until the latest point of time after, e.g., machine shipment) of machine state data regarding a machine state in operation of the injection molding machine during a predetermined period and/or in every predetermined period and a singular value such as an unexpected error can be efficiently recorded and a user can easily check such a changing trend. On this point, the injection molding machine disclosed in Japanese Patent No. 5811035 displays, on the display unit, the load status of the drive unit across the multiple cycles. The injection molding machine obtains the load factor of the drive unit every time one cycle is executed, and on the display unit, displays the load factor trend showing the change in the load factor obtained across the multiple cycles. The injection molding machine fails to efficiently record a changing trend of machine state data regarding a machine state in operation of the injection molding machine during a predetermined period and/or in every predetermined period and a singular value such as an unexpected error. Moreover, the injection molding machine disclosed in Japanese Unexamined Patent Application, Publication No. 2004-148593 calculates the average load factor of each motor across the multiple cycles in such a manner that the motor load factors of each motor during one cycle of the molding step are averaged multiple times, and therefore, can eliminate variation in the motor load factor of each motor and can reliably visually check the average load factor of each motor. The injection molding machine fails to efficiently record a changing trend of machine state data regarding a machine state in operation of the injection molding machine during a predetermined period and/or in every predetermined period and a singular value such as an unexpected error. That is, it is difficult for any of these injection molding machines to grasp a long-term change in the operation data value. Further, it is expected that operation data (operation data indicating the singular value as a unique data value different from that in a normal state) when abnormality has occurred is lost in the course of averaging the operation data values. However, the singular value is often caused due to malfunction of the injection molding machine, and when the singular value is lost, investigation of the cause for malfunction is difficult.

An object of the present invention is to provide an injection molding information management support device and an injection molding machine that can efficiently record a changing trend of machine state data regarding a machine state in operation of the injection molding machine during a predetermined period and/or in every predetermined period and a singular value such as an unexpected error.

(1) One aspect of the present disclosure relates to an injection molding information management support device for managing machine state data regarding a machine state in operation of an injection molding machine during a predetermined period and/or in every predetermined period, the injection molding information management support device including an accessibly-connected storage unit and a control unit. The control unit includes a machine state data acquisition unit that acquires a machine state data value for each molding cycle in the injection molding machine, and a frequency distribution data recording unit that converts the machine state data value acquired by the machine state data acquisition unit into a class data value indicating the preset class of the machine state data value and records a frequency during the predetermined period and/or in every predetermined period in the storage unit.

(2) One aspect of the present disclosure relates to an injection molding machine including the injection molding information management support device according to (1).

According to one aspect, the changing trend of the machine state data regarding the machine state in operation of the injection molding machine during the predetermined period and/or in every predetermined period and the singular value such as the unexpected error can be efficiently recorded.

BRIEF DESCRIPTION OF THE DRAWINGS

FIG. 1 is a diagram showing the outline of an injection molding machine and an injection molding information management support device in a first embodiment of the present invention;

FIG. 2 is a graph showing one example where transition of a load factor until the latest point of time after machine shipment is displayed in the form of a histogram;

FIG. 10C is a graph showing one example where transition of the motor load factor in a case where the cumulative frequency threshold for each class in the frequency distribution is updated is displayed in the form of a histogram;

FIG. 12A is a graph showing one example where the distribution of the frequency of the motor load factor in each injection molding machine in a case where the multiple injection molding machines mold the same article with the same mold and the same machine specifications under the same operation condition is displayed; and FIG. 12B is a graph showing one example where the distribution of the frequency of the motor load factor in each injection molding machine in a case where the multiple injection molding machines mold the same article with the same mold and the same machine specifications under the same operation condition is displayed.

DETAILED DESCRIPTION OF THE INVENTION

Figure 3A:
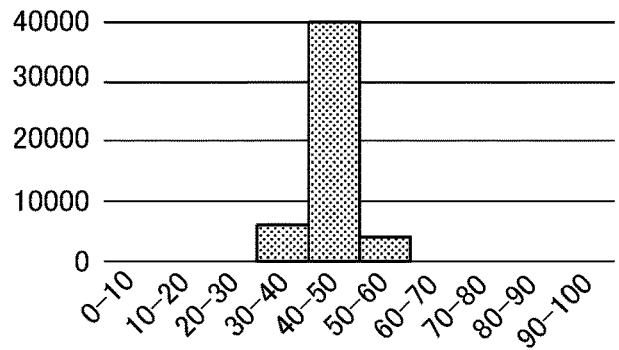
FIG. 3A is a graph showing one example where transition of the load factor is displayed in the form of a histogram for each cumulative shot number.

Hereinafter, an embodiment of the present invention will be described in detail with reference to the drawings.
(First Embodiment)
Hereinafter, one embodiment of an injection molding information management support device of the present invention will be described with reference to the drawings. FIG. 1 shows, as an example, one embodiment that an injection molding information management support device 7 is provided as an device different from an injection molding machine 1. FIG. 1 shows, as an example, a case where the injection molding machine 1 and the injection molding information management support device 7 are directly connected to each other via an interface, but the present invention is not limited to such an example. For example, the injection molding machine 1 and the injection molding information management support device 7 may be connected to each other via a network. In FIG. 1, the single injection molding information management support device 7 is connected to the single injection molding machine 1, but multiple N (N≥2) injection molding machines 1-$n$ (1≤n≤N) may be connected to the single injection molding information management support device 7 as described later. Alternatively, the injection molding machine 1 may include the injection molding information management support device 7 as described later. In this case, the injection molding machine 1-1 including the injection molding information management support device 7 may collectively manage the other injection molding machines 1-$n$ (2≤n≤N) including no injection molding information management support devices 7. The injection molding machine 1 will be briefly described before the injection molding information management support device 7 is described.
<Injection Molding Machine>

As shown in FIG. 1, a mold opening/closing clamping mechanism (hereinafter also referred to as a "clamping unit 10") and an injection unit 40 are provided on a machine stand (not shown) to form a body portion of the injection molding machine 1. As described later, the clamping unit 10 includes multiple moving units such as a moving platen 13 and an ejector mechanism 50. Moreover, the injection molding machine 1 includes a control device 60.
<Clamping Unit>

The clamping unit 10 will be described. In the clamping unit 10, a stationary platen 12 and a rear platen 15 are coupled to each other with multiple tie-bars (not shown), and between the stationary platen 12 and the rear platen 15, the moving platen 13 is movably arranged along the tie-bars.

Moreover, a stationary-side mold 32 of a mold 30 is attached to the stationary platen 12, and a moving-side mold 33 is attached to the moving platen 13.

The moving platen 13 is movable right to left as viewed in FIG. 1 through a toggle mechanism 20 forming the clamping unit 10 by a mold opening/closing clamping servomotor 21 (hereinafter also referred to as a "clamping servomotor 21") attached to the rear platen 15. Specifically, a ball screw (not shown) is driven through a power transmission section such as a pulley and a belt by drive of the clamping servomotor 21, and the toggle mechanism 20 is accordingly driven to move forward or backward (a right direction or a left direction in FIG. 1). Then, the moving platen 13 moves forward or backward in a stationary-platen-12 direction to perform opening/closing and clamping of the mold 30 and mold opening. A position/speed detector 21$a$ that detects the rotation position/speed of the clamping servomotor 21, such as a pulse coder, is attached to a motor axis of the clamping servomotor 21. It is configured such that the position of the moving platen 13 (the moving-side mold 33) is detected according to a position feedback signal from the position/speed detector 21$a$.
<Ejector Mechanism>

An ejector servomotor 51 that drives the product ejection mechanism 50 (hereinafter also referred to as the "ejector mechanism 50") is attached to the moving platen 13. The ejector mechanism 50 is a mechanism for ejecting a molded article out of the mold 30 (the moving-side mold 33) provided at the moving platen 13. Specifically, the ejector mechanism 50 transmits rotary force of the ejector servomotor 51 to an eject pin 14 through a power transmission section (not shown) including a pulley and a belt (a timing belt) and a ball screw/nut mechanism (not shown), and causes the eject pin 14 to protrude into the mold 30 (the moving-side mold 33). In this manner, the ejector mechanism 50 ejects the molded article out of the mold 30 (the moving-side mold 33). A position/speed detector 51$a$ that detects the rotation position/speed of the ejector servomotor 51, such a pulse coder, is also attached to the ejector servomotor 51. It is configured such that the position of the eject pin 14 is detected according to a position feedback signal from the position/speed detector 51$a$.
<Injection Unit>

The injection unit 40 includes, for example, a hopper 48, an injection cylinder 41, an injection screw 43, an injection servomotor 46, and a measuring servomotor 45. For supplying a resin material into the injection cylinder 41, the hopper 48 is provided on an upper portion of the injection cylinder 41. A nozzle portion 42 is attached to a tip end of the injection cylinder 41, and the injection screw 43 is inserted into the injection cylinder 41. A pressure sensor 47, such as a load cell, that detects a pressure on molten resin in the injection cylinder 41 according to a pressure on the injection screw 43 is provided at the injection screw 43. For example, the detected resin pressure (the resin pressure on the screw 43) can be measured based on a detection signal from the pressure sensor 47. The injection screw 43 is, by the measuring servomotor 45, rotated forward or backward through a transmission section 45$c$ including a pulley, a timing belt, etc. A position/speed detector 45$a$ that detects the rotation position/speed of the measuring servomotor 45, such as a not-shown pulse coder, is attached to the measuring servomotor 45, thereby detecting the rotation position or rotation speed of the injection screw 43. The injection screw 43 is, by the injection servomotor 46, driven through a transmission section 46$c$ including a mechanism that converts rotation motion into linear motion, such as a pulley, a belt, and a ball screw/nut mechanism, and in the injection cylinder 41, moves in a long-axis direction of the injection cylinder 41. A position/speed detector 46a that detects the rotation position/speed of the injection servomotor 46, such as a pulse coder, is attached to the injection servomotor 46, thereby detecting the axial position/speed of the injection screw 43. Note that the injection servomotor is also referred to as a screw axis motor.

<Measuring Instruments>

The pressure sensor 47 that detects the pressure on the molten resin in the injection cylinder 41 according to the pressure on the injection screw 43 has been described above as an example, but a measuring instrument such as a sensor is not limited to such a sensor. For example, temperature sensors that measure the temperature of each servomotor 45, 46, 21, 51, a cylinder temperature, a mold temperature, etc. can be each placed at locations. A measuring instrument that measures an instantaneous current value and an instantaneous voltage value of each servomotor 45, 46, 21, 51 may be placed. A strain sensor may be placed for measuring clamping force. Machine state data regarding a machine state in operation of the injection molding machine 1 is measured by these measuring instruments, and therefore, the injection molding machine 1 (the control device 60) can detect, for example, the load factor and temperature of each servomotor 45, 46, 21, 51, a peak pressure at an injection/packing step, the clamping force at a clamping step, power consumption, injection time, measurement time, and cycle time.

More specifically, regarding the load factor of each servomotor, an instantaneous load factor may be, as described in, e.g., Japanese Unexamined Patent Application, Publication No. 09-262889, calculated based on an instantaneous power value calculated from the instantaneous current value and the instantaneous voltage value of each servomotor and a rated value of each servomotor. From the instantaneous load factor, an average load factor per unit time, an average load factor per step, an average load factor per cycle, and the maximum load factor per cycle may be detected, for example. Note that in the present embodiment, the maximum load factor of each servomotor may be employed as the machine state data. The above-described load factor may be employed as the servomotor load factor.

The peak pressure at the injection/packing step may be detected by the pressure sensor 47 arranged between the injection servomotor 46 and the injection screw 43, for example.

Regarding the clamping force at the clamping step, a strain sensor that senses a strain amount of a component of a clamping device may be, as described in, e.g., Japanese Unexamined Patent Application, Publication No. 09-187853, provided to detect the clamping force from the strain amount sensed by the strain sensor, for example. Note that the machine state data to be measured is not limited to above. Optional measurable data well-known by those skilled in the art may be detected.

<Control Device>

The control device 60 that controls the injection molding machine 1 includes, for example, a numerical control unit 61, a programmable logic controller PLC 62, and a servo-control unit 63. The PLC 62 includes a PLCCPU 621 that controls sequence operation of the injection molding machine 1 and a storage unit 622 used for temporarily storing, e.g., a sequence program and calculation data. The numerical control unit 61 includes a numerical control CPU 611 that controls the injection molding machine 1 as a whole and a storage unit 612 used for temporarily storing, e.g., an automatic operation program and calculation data.

The servo-control unit 63 includes a servo-control CPU 631 that performs the processing of a position loop, a speed loop, and a current loop and a storage unit 632 used for temporarily storing a control program and data dedicated to servo-control. Further, a servo-amplifier 45b that drives the measuring servomotor 45, a servo-amplifier 46b that drives the injection screw 43 in an axial direction to drive the injection servomotor 46 that performs injection, etc., a clamping servo-amplifier 21b that drives the clamping servomotor 21 that moves the toggle mechanism 20 forward or backward (the right direction or the left direction in FIG. 1) to drive the toggle mechanism 20 and moves the moving platen 13 forward or backward in the stationary-platen-12 direction to perform opening/closing and clamping of the mold 30 and mold opening, and a servo-amplifier 51b that drives the ejector servomotor 51 are connected to the servo-control unit 63. The position/speed detectors 45a, 46a, 21a, 51a are each attached to the servomotors 45, 46, 21, 51, and output from the position/speed detectors 45a, 46a, 21a, 51a is fed back to the servo-control unit 63. The servo-control unit 63 performs position/speed feedback control based on a movement command for each axis (the measuring servomotor 45, the injection servomotor 46, the clamping servomotor 21, the ejector servomotor 51) from the numerical control unit 61 and the detected positions/speeds fed back from the position/speed detectors 45a, 46a, 21a, 51a, and executes drive current feedback control for each servomotor 45, 46, 21, 51 to drive and control each servomotor 45, 46, 21, 51 through each servo-amplifier 45b, 46b, 21b, 51b. With this configuration, e.g., a latest value register that stores the rotation position of the injection servomotor 46 fed back from the position/speed detector 46a is provided so that the position (the injection position) of the injection screw 43 in the axial direction can be detected according to the rotation position of the injection servomotor 46. The position of the moving platen 13 (the moving-side mold 33) can be detected according to the position feedback signal from the position/speed detector 21a, such as the pulse coder, that detects the rotation position/speed of the clamping servomotor 21 attached to the motor axis of the clamping servomotor 21. The control device 60 is connected to a display 65 including liquid crystal or a CRT.

With the above-described configuration, the PLC 62 controls the sequence operation of the entirety of the injection molding machine, the numerical control unit 61 distributes the movement command to each servomotor axis based on, e.g., the operation program and molding conditions, and the servo-control unit 63 executes the servo-control such as position loop control, speed loop control, and current loop control (torque control) based on the movement command distributed to each axis (the measuring servomotor 45, the injection servomotor 46, the clamping servomotor 21, the ejector servomotor 51) and the position/speed feedback signals detected by the position/speed detectors 45a, 46a, 21a, 51a to execute so-called digital servo-processing.

For example, when a mold closing command is input, the servo-control unit 63 obtains a position error amount based on the movement command and the feedback signal from the position/speed detector 21a, obtains a speed command by multiplying the position error amount by a position gain, and obtains a speed error by subtracting the latest speed of the clamping servomotor 21 detected by the position/speed detector 21a from the speed command. Then, the servo-control unit 63 performs the speed loop processing to obtain a current command value as a torque command for the clamping servomotor 21, and performs the current loop processing according to a difference between the current command value and the latest drive current value of the clamping servomotor 21 to output the result to the clamping servo-amplifier 21b. In this manner, the servo-control unit 63 drives and controls the clamping servomotor 21. Note that the same also applies to control of other servomotors, and the configuration of the control device 60 and the configuration of the mechanism of the injection molding machine 1 are also similar to those of a typical injection molding machine. The injection molding machine 1 has been described above. Note that, e.g., the configuration and functions of the injection molding machine 1 are techniques well-known by those skilled in the art, and detailed description thereof will be omitted. Next, the injection molding information management support device 7 will be described.

<Injection Molding Information Management Support Device>

The injection molding information management support device 7 (hereinafter also referred to as a "management support device 7" for short) is directly connected to the injection molding machine 1 via the interface. The management support device 7 includes, for example, a computer such as a PC, and includes a control unit 71, a storage unit 72, a display unit 75 having a CRT or liquid crystal, and an input unit 76 that inputs data or a command, such as a keyboard or a mouse. The management support device 7 acquires, in, e.g., every molding cycle, various types of measurement data from the injection molding machine 1, and stores such data in the storage unit 72. Note that the control unit 71 of the management support device 7 includes a CPU, a memory, etc. included in a typical computer (not shown). The management support device 7 converts a machine state data value generated in large quantity in the injection molding machine 1 and acquired in every molding cycle into a class data value indicating the preset class of the machine state data value to record the class data value in the storage unit 72. Thus, a changing trend in the machine state data regarding the machine state in operation of the injection molding machine 1 during a predetermined period and/or in every predetermined period and a singular value such as an unexpected error can be efficiently recorded, and a user can easily check the changing trend. Note that the machine state data value of the injection molding machine 1 varies according to the mold to be used upon molding, and for this reason, mold identification information is preferably linked with a frequency so that the frequency can be displayed for each mold. Thus, the management support device 7 has functional units described below.

FIG. 1 shows a functional configuration of the control unit 71 of the management support device 7. As shown in FIG. 1, the control unit 71 includes a machine state data acquisition unit 711, a frequency distribution data recording unit 713, an output control unit 714, and a cumulative frequency monitoring unit 715.

<Machine State Data Acquisition Unit 711>

The machine state data acquisition unit 711 acquires, by a memory (not shown) such as a RAM, the machine state data regarding the machine state in molding operation of the injection molding machine 1. Specifically, the machine state data acquisition unit 711 may monitor, for example, a molding cycle start signal generated by the numerical control unit 61 of the injection molding machine 1, and may take detection of a signal for starting a next cycle as completion of the previous molding cycle. Based on completion of the previous molding cycle, the machine state data acquisition unit 711 may acquire the machine state data in the previous molding cycle. Note that the machine state data acquisition unit 711 preferably acquires the machine state data on all types of molding operation after shipment of the injection molding machine 1. Note that in addition to acquisition of the machine state data, the machine state data acquisition unit 711 acquires the identification information on the mold used in the molding operation and a cumulative shot number (indicating to which cumulative shot number by the injection molding machine 1 a shot for the molding operation corresponds) for the molding operation and/or the date and time (e.g., a time stamp indicating the end time of the molding cycle) of the molding operation with these types of information being linked with the machine state data. Hereinafter, the "cumulative shot number (indicating to which cumulative shot number by the injection molding machine 1 the shot for the molding operation corresponds) for the molding operation and/or the date and time (e.g., the time stamp indicating the end time of the molding cycle) of the molding operation" will be referred to as molding date-and-time identification information for the sake of simplicity. The machine state data described herein is a molding data value at each step (a mold closing step, the clamping step, a filling step, a packing step, a cooling step (a measurement step), a mold opening step, and an ejection step) forming the molding cycle. In the present embodiment, the machine state data acquired by the machine state data acquisition unit 711 includes at least any one of the motor load factor or motor temperature of each servomotor 45, 46, 21, 51, the peak pressure at the injection/packing step, the clamping force at the clamping step, the power consumption, the measurement time, the injection time, or the cycle time, but the present invention is not limited to above. As described above, the optional machine state data obtained in such a manner that the measuring instrument measures the machine state data regarding the machine state in operation of the injection molding machine 1 may be included.

<Frequency Distribution Data Recording Unit 713>

The frequency distribution data recording unit 713 converts the machine state data value acquired by the machine state data acquisition unit 711 into the class data value indicating the preset class of the machine state data value. Specifically, in a case where the machine state data value is the motor load factor (%), the load factor is converted into the frequency separated in every 10%, for example. That is, the load factor S is converted into ten frequency classes of 0%≤S<10%, 10%≤S<20%, . . . , 80%≤S<90%, 90%≤S≤100%. Note that these ten frequency classes have been described as one example, and the present invention is not limited to above. An optional frequency may be employed corresponding to the machine state data value.

Moreover, based on the molding date-and-time identification information of the machine state data—the frequency distribution data recording unit 713 associates the class data value converted from the machine state data value with during the predetermined period and/or in every predetermined period (i) (i is herein a natural number indicating a sequential order). Specifically, a case where the predetermined period is a period of every 20,000 in units of cumulative shot number and a value for each molding cycle is used will be described, for example. In this case, in a case where the shot number in the molding date-and-time identification information linked with the machine state data value is, for example, equal to or less than 20,000 shots, the machine state data value is associated with a predetermined period (1) of 1 to 20,000 in units of cumulative shot number. In a case where the shot number in the molding date-and-time identification information linked with the machine state data value is, for example, equal to or greater than 20,001 shots and equal to or less than 40,000 shots, the machine state data value is associated with a predetermined period (2) of 20,001 to 40,000 in units of cumulative shot number. As described above, the frequency distribution data recording unit 713 can convert the machine state data value acquired by the machine state data acquisition unit 711 into the class data value indicating the preset class of the machine state data value, can link the class data value with the mold identification information, and can associate the class data value with the predetermined period (i) calculated based on the molding date-and-time identification information of the machine state data. The frequency distribution data recording unit 713 can record such an association in the storage unit 72. Hereinafter, the data recorded in the storage unit 72 during the predetermined period and/or in every predetermined period (i) as described above will be also referred to as frequency distribution data. The frequency distribution data recording unit 713 may categorize the class data value converted from the machine state data value based on a preset condition, and based on the group of categorized class data values, may produce categorical frequency distribution data for each category and may record such data in the storage unit 72. The preset condition described herein includes at least a condition where the same mold is used for injection molding or a condition where the molding date-and-time identification information falls within the range of the preset cumulative shot number, for example. Note that the frequency distribution data recording unit 713 may delete, after the frequency distribution data on the cycle has been recorded in the storage unit 72, the machine state data regarding the machine state in the molding operation of the injection molding machine 1 in the cycle from the memory having temporarily stored such data by the machine state data acquisition unit 711. The example where the molding date-and-time identification information is set based on the cumulative shot number has been described above, but the present invention is not limited to such an example. A period (from the date and time of the start of the period to the date and time of the end of the period) of a processing cycle may be applied. As described above, the frequency distribution data recording unit 713 records, without recording each machine state data value as it is, the class data value converted from the machine state data value. Moreover, the frequency distribution data recording unit 713 associates, instead of directly associating the class data value with the molding date-and-time identification information, the class data value with the predetermined period (e.g., a period of every 20,000 shots) converted from the molding date-and-time identification information. Further, the frequency distribution data recording unit 713 produces the frequency distribution data linked with the identification information on the mold used in the molding operation. With this configuration, the frequency corresponding to the class data value is updated and recorded in every same predetermined period (e.g., in every 20,000 shots). Thus, as compared to a method in which the machine state data value is saved in each cycle, a storage capacity for storing the frequency distribution data can be significantly reduced, and the data can be saved for a long period of time. Further, for the singular value generated during the predetermined period, the frequency thereof can be also recorded. For example, as described above, assuming that classes (ten classes) are set in, e.g., every 10% for each type (80 types) of data instead of saving all of 80 types of data for each cycle, i.e., each of 20,000,000 shots and the frequency at each class is stored in every 20,000 in units of cumulative shot number, if four bytes are necessary for storing the frequency at each class, a data amount necessary for storing the frequency distribution in every 20,000 in units of cumulative shot number is 4×10×80=3200 bytes (=3.2 KB). In this case, a storage capacity necessary for storing all of 20,000,000 shots is 3.2 KB×1,000=3,200 K=3.2 MB. With this configuration, a memory usage can be 0.1% of 3.2 GB necessary for saving all of 80 types of data for each cycle, i.e., 20,000,000 shots. The injection molding machine can save operation status data for 20,000,000 shots. Needless to say, the data is lost according to the range of the class when the data is saved as the frequency distribution. However, according to the present invention, it is enough that the frequency in association with the class is updated, and a memory amount necessary for saving can be reduced. Moreover, due to long-term data saving and singular value saving, long-term grasping of an operation status of the injection molding machine as an object of the present invention can be fully realized. Note that the number of shots in the predetermined period can be set as necessary according to the operation status of the injection molding machine 1.

<Output Control Unit 714>

The output control unit 714 can output, to the display unit 75, the frequency distribution data recorded in the storage unit 72 by the frequency distribution data recording unit 713 in a histogram form. The output control unit 714 can sort the class data value in descending order of frequency based on the frequency distribution data recoded in the storage unit 72 by the frequency distribution data recording unit 713, and can output, to the display unit 75, data with a Pareto chart in which a line graph of a cumulative relative frequency is on the histogram. The output control unit 714 can output, to the display unit 75, the categorical frequency distribution data recorded in the storage unit 72 by the frequency distribution data recording unit 713 in a histogram form. The output control unit 714 can sort the class data value in descending order of frequency based on the categorical frequency distribution data recoded in the storage unit 72 by the frequency distribution data recording unit 713, and can output, to the display unit 75, data with the Pareto chart in which the line graph of the cumulative relative frequency is on the histogram. The output control unit 714 may not only make the above-described output to the display unit 75, but also output a file to optional external equipment.

Next, an example of the frequency distribution data or the categorical frequency distribution data will be described with reference to FIGS. 2, 3A to 3C, 4A to 4C, and 5. FIG. 2 is a graph showing one example where transition of the motor load factor (e.g., the injection servomotor load factor) until, e.g., the latest point of time after machine shipment is displayed in the form of a histogram. For the histogram shown in FIG. 2, the motor load factor is applied as the machine state data, taking a period from machine shipment to the latest point of time as the predetermined period. In the example shown in FIGS. 2, 3A to 3C, 4A to 4C, and 5, the frequency distribution data is produced in every 50,000 shots as the predetermined period, but the present invention is not limited to such an example. The predetermined period can be set as necessary according to the injection molding machine 1. That is, taking the period from machine shipment to the latest point of time as one period, the frequency distribution data recording unit 713 records, in the storage unit 72, the frequency distribution data obtained by conversion of the machine state data (the motor load factor) in operation in such a period into the class data value (the frequency), and the output control unit 714 outputs the frequency distribution histogram according to the motor load factor since shipment of the injection molding machine 1. Note that the histogram shown in FIG. 2 shows, without distinction among molds, the distribution of the motor load factor measured for all shots since machine shipment regardless of the mold used in molding. As described above, the frequency distribution according to the motor load factor since shipment of the injection molding machine 1 is displayed in the form of a histogram, and therefore, the user can efficiently and easily check the long-term condition of distribution of the motor load factor of the injection molding machine 1. Further, even the number of times of occurrence of a singular value with a motor load factor of equal to or greater than 90% can be easily checked, for example.

Figure 3B:
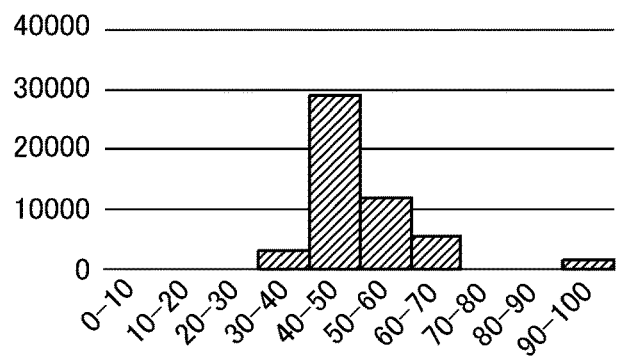
FIG. 3B is a graph showing one example where transition of the load factor is displayed in the form of a histogram for each cumulative shot number.
Figure 3C:
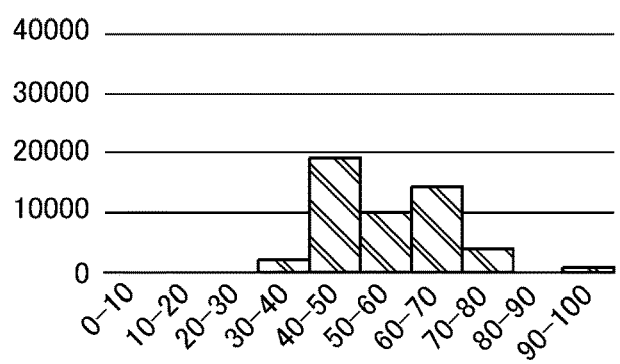
FIG. 3C is a graph showing one example where transition of the load factor is displayed in the form of a histogram for each cumulative shot number.

FIGS. 3A to 3C, 4A to 4C, and 5 are graphs showing one example where transition of the motor load factor measured for all shots up to 150,000 in units of cumulative shot number since machine shipment (a cumulative shot number of 0) is displayed in the form of a histogram for each cumulative shot number regardless of the mold used in molding as in FIG. 2. Specifically, the histograms shown in FIGS. 3A to 3C, 4A to 4C, and 5 show the distribution of the motor load factor in each period in the form of a histogram, taking each of a period of 0 to 50,000 in units of cumulative shot number, a period of 50,000 to 100,000 in units of cumulative shot number, and a period of 100,000 to 150,000 in units of cumulative shot number as the predetermined period. That is, the frequency distribution data recording unit 713 categorizes the period up to 150,000 in units of cumulative shot number since machine shipment (a cumulative shot number of 0) into three periods by every 50,000 shots, and in the storage unit 72, records the categorical (by period) frequency distribution data obtained by conversion of the machine state data (the motor load factor) in operation in each period into the class data value (the frequency). The output control unit 714 outputs the histogram of the categorical frequency distribution according to the motor load factor in each period for the injection molding machine 1. Note that when displaying the frequency distribution histograms for the multiple periods on the display unit 75, the output control unit 714 can simultaneously display these histograms such that a difference in the trend of the frequency distribution among the periods is easily grasped. For example, graphs in different colors may be displayed on the display unit 75 so that the frequency distribution corresponding to each period can be identified as described later with reference to FIG. 5. With this configuration, the difference in the trend of the frequency distribution among the periods is more easily grasped. Referring to FIGS. 3A to 3C, it can be easily confirmed that the tendency shows that the motor load factor relatively increases as the cumulative shot number in the period (e.g., the period of 50,000 to 100,000 in units of cumulative shot number, the period of 100,000 to 150,000 in units of cumulative shot number) increases. If an operation condition is not changed during the period of 0 to 150,000 in units of cumulative shot number, the user can estimate that deterioration or abnormality of the injection molding machine 1 has occurred. In this case, the user changes the operation condition of the injection molding machine 1 such that a motor load decreases, and therefore, can perform preventive maintenance by decreasing the motor load factor. Moreover, component deterioration assumed as a cause for increasing the motor load is estimated so that such a component can be replaced.

Referring to, e.g., FIG. 3B, it can be confirmed that in the period of 50,000 to 100,000 in units of cumulative shot number, a normally-impossible high-load abnormal operation value (the singular value) with a load factor of 90% to 100% has been caused. Further, referring to FIG. 3C, it can be confirmed that the load on the machine tends to increase in subsequent molding. For example, the following causes can be predicted from these histograms. As the cause for increasing the servo-load, insufficient resin melting, foreign matter inclusion, software bug, etc. are conceivable. Further, since the load tends to increase after the normally-impossible high-load abnormal operation value (the singular value) with a load factor of 90% to 100% has been caused, the probability of damage of the screw or the cylinder can be estimated.

Figure 4A:
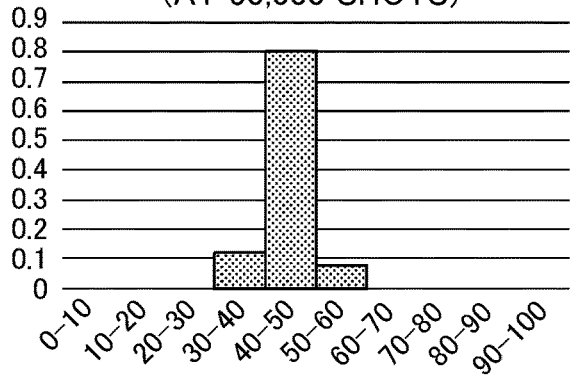
FIG. 4A is a graph showing one example where transition of the load factor is displayed in the form of a histogram for each cumulative shot number according to a percentage per shot.
Figure 4B:
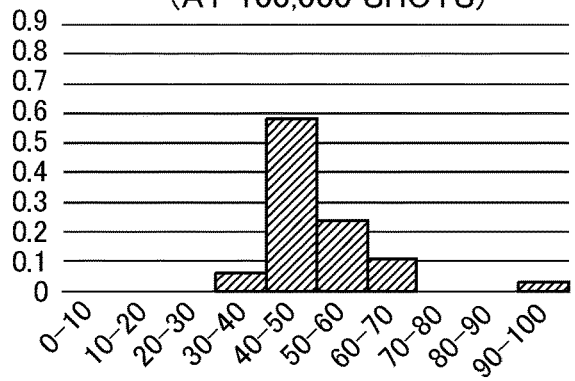
FIG. 4B is a graph showing one example where transition of the load factor is displayed in the form of a histogram for each cumulative shot number according to the percentage per shot.
Figure 4C:
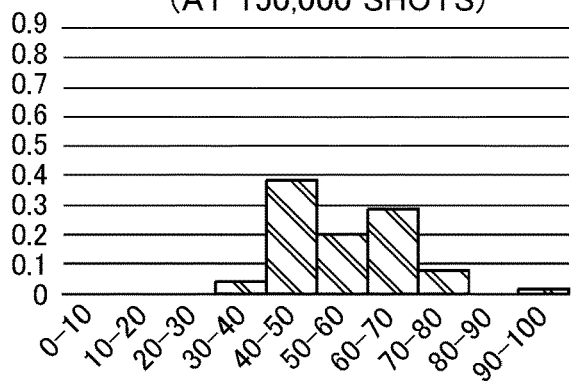
FIG. 4C is a graph showing one example where transition of the load factor is displayed in the form of a histogram for each cumulative shot number according to the percentage per shot.

Although the vertical axis of the histogram is the shot number in FIGS. 3A to 3C, a percentage per shot may be displayed instead of the shot number, the percentage being obtained by division of the frequency (the shot number) by the total shot number. FIGS. 4A to 4C show one example where transition of the motor load factor measured for all of 150,000 in units of cumulative shot number since machine shipment (a cumulative shot number of 0) is displayed for each cumulative shot number in the form of a histogram. In FIG. 4A, the vertical axis is a percentage per shot, the percentage being obtained by division of the frequency in the period of 0 to 50,000 in units of cumulative shot number by a total shot number of 50,000. Similarly, in FIG. 4B, the vertical axis is a percentage per shot, the percentage being obtained by division of the frequency in the period of 50,000 to 100,000 in units of cumulative shot number by a total shot number of 100,000. In FIG. 4C, the vertical axis is a percentage per shot, the percentage being obtained by division of the frequency in the period of 100,000 to 150,000 in units of cumulative shot number by a total shot number of 150,000. With this configuration, transition of the distribution of the load factor can be easily grasped. For example, FIG. 4A shows that in the period of 0 to 50,000 in units of cumulative shot number, the shots with a load of 40% to 50% hold about 80% of the entire range and the remaining 20% shots have a load of 30% to 40% or 50% to 60%. On the other hand, in the period of 50,000 to 100,000 in units of cumulative shot number, a load factor increasing trend can be, referring to FIG. 4B, easily confirmed. In such a trend, the shots with a load factor of 40% to 50% hold slightly less than about 60% of the entire range, the shots with a load factor of 50% to 60% hold slightly greater than about 20% of the entire range, and the shots with a load factor of 60% to 70% hold slightly greater than about 10% of the entire range. Moreover, the shots indicating a singular value with a load factor of 90% to 100% are observed for the first time. Further, referring to FIG. 4C, the trend that the frequency of the shots with a load factor of 40% to 50% further decreases and the frequency of the shots with a load factor of equal to or greater than 50% increases can be easily confirmed in the period of 100,000 to 150,000 in units of cumulative shot number.

Figure 5:
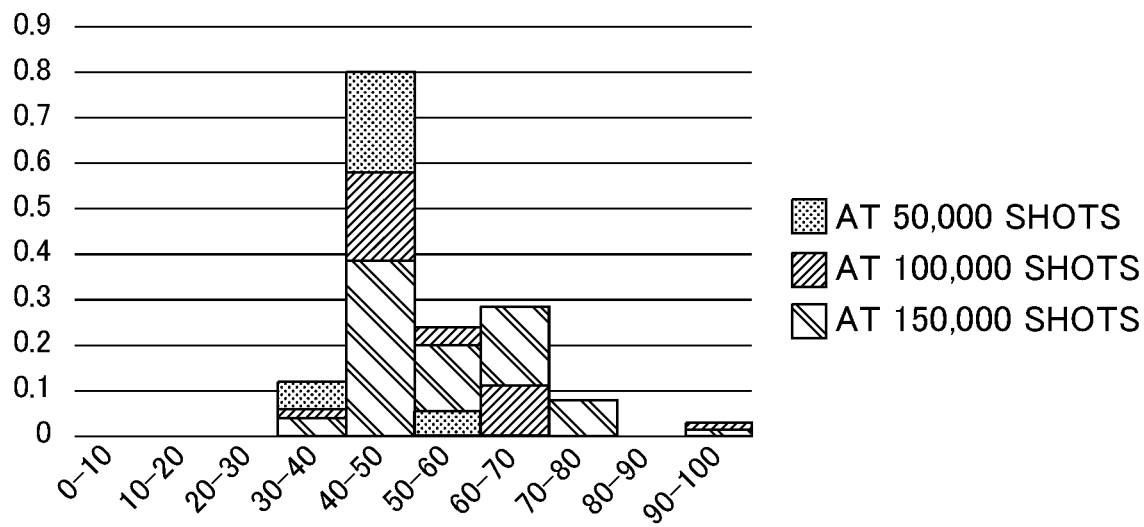
FIG. 5 is a graph showing one example where histograms showing the load factor for each cumulative shot number are displayed with the histograms overlapping with each other.

For example, the graphs in the different colors may be displayed on the display unit 75 so that the frequency distribution corresponding to each cumulative shot number can be identified. With this configuration, the difference in the trend of the frequency distribution among the periods is more easily grasped. FIG. 5 is a graph in which the load factors for each cumulative shot number are displayed on each other so that transition of the load factor can be compared. With this configuration, it can be accurately grasped that the frequency of the shots with a load factor of 40% to 50% decreases and the frequency of the shots with a load factor of equal to or greater than 50% increases as the cumulative shot number increases as shown in FIG. 5.

Figure 6:
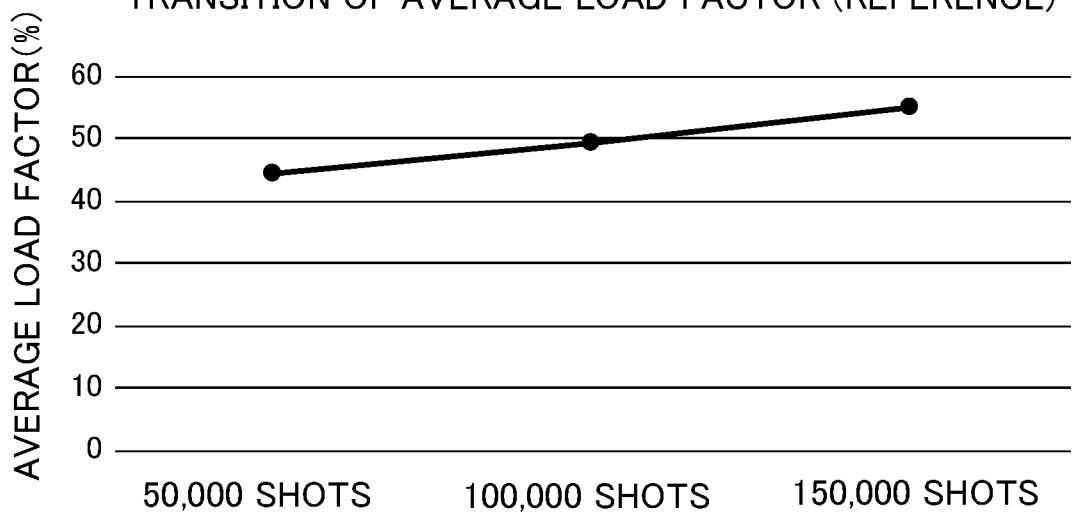
FIG. 6 is a graph showing one example where an average value of the load factors for each cumulative shot number is displayed.

Significant differences between the present invention and the case of displaying the average load factor for each predetermined period as typically implemented will be described herein. FIG. 6 shows a line graph of the average load factor for each cumulative shot number (50,000, 100, 000, 150,000 shots). Referring to FIG. 6, it can be confirmed that the load factor increases as the cumulative shot number increases. However, unlike the present invention, it can be understood that the singular value is lost at the time of calculation of the average load factor for each cumulative shot number (50,000, 100,000, 150,000 shots) and, for this reason, it is difficult to predict the cause for increasing the load factor. It has been described above that regardless of the mold used in molding, the frequency distribution according to the motor load factor of the injection molding machine 1 measured for all shots since machine shipment is provided for each predetermined period so that, e.g., the presence or absence of the singular value and the distribution of the operation data can be easily grasped. Next, a case where a distribution status according to the motor load factor of the injection molding machine 1 measured for the shots until, e.g., the latest point of time after machine shipment is displayed in the form of a histogram for each mold used in molding will be described with reference to FIGS. 7A, 7B, 8, and 9.

Figure 7A:
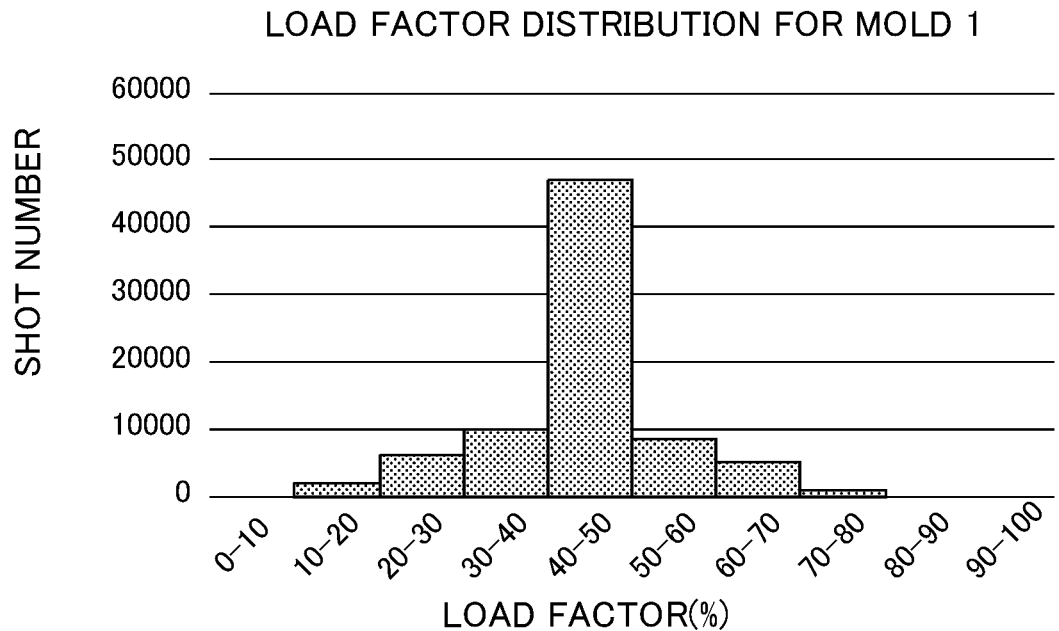
FIG. 7A is a graph showing one example where the load factor for each mold until the latest point of time after machine shipment is displayed in the form of a histogram.
Figure 7B:
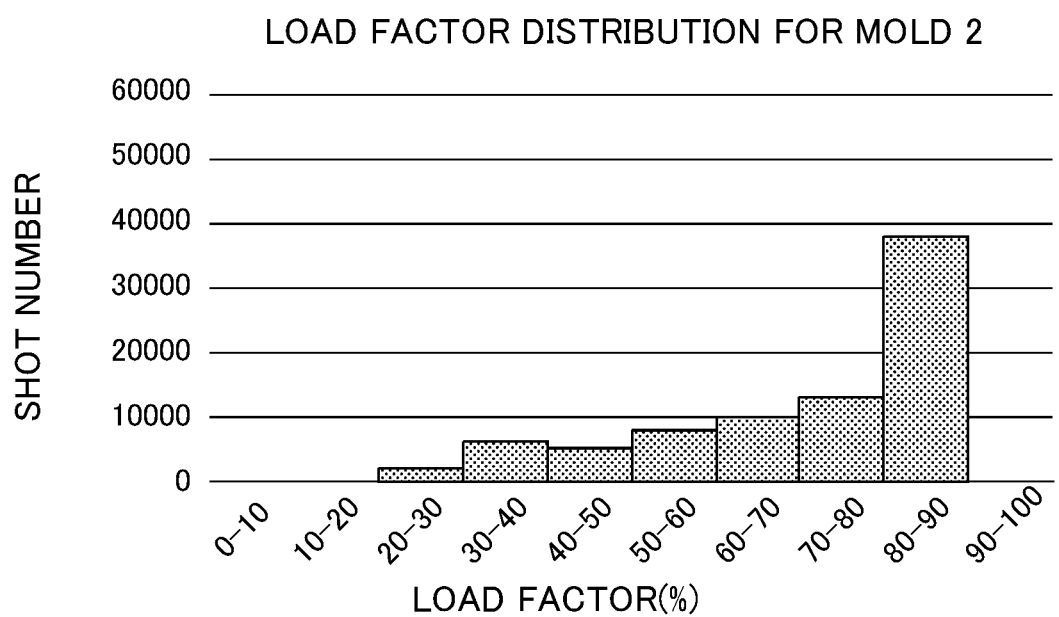
FIG. 7B is a graph showing one example where the load factor for each mold until the latest point of time after machine shipment is displayed in the form of a histogram.

FIGS. 7A and 7B show one example where the distribution of the load factor for each mold is displayed on the display unit 75. Specifically, FIGS. 7A and 7B are graphs showing one example where the distribution of the motor load factor until, e.g., the latest point of time after machine shipment is displayed in the form of a histogram for each mold. The above-described histogram shown in FIG. 2 shows, without distinction among molds, the distribution of the motor load factor regardless of the mold used in molding, taking the period until the latest point of time after machine shipment as the predetermined period. On the other hand, FIGS. 7A and 7B show, for each mold used in molding, the distribution of the motor load factor in, e.g., the period until the latest point of time after machine shipment as the predetermined period. That is, in the period until the latest point of time after machine shipment (a cumulative shot number of 0), the frequency distribution data recording unit 713 records, in the storage unit 72, the categorical (by mold) frequency distribution data obtained by conversion of the machine state data (the motor load factor) in operation in each period into the class data value (the frequency). The output control unit 714 outputs the histogram of the categorical (by mold) frequency distribution according to the motor load factor in molding using each mold of the injection molding machine 1. Referring to FIGS. 7A and 7B, e.g., the distribution of the motor load factor indicated by the mold can be easily checked. Specifically, the user can easily confirm that the motor load factor is greater in the molding operation using a mold 2 than in the molding operation using a mold 1. Note that the output control unit 714 can simultaneously display the histograms of the frequency distribution for each mold such that a difference in the trend of the mold is easily grasped when these histograms are displayed on the display unit 75. With this configuration, in the case of molding with the mold 2, the user changes the operation condition of the injection molding machine 1 such that, e.g., the motor load decreases, and in this manner, can decrease the motor load factor in the case of using the mold 2 and can perform preventive maintenance.

Figure 8:
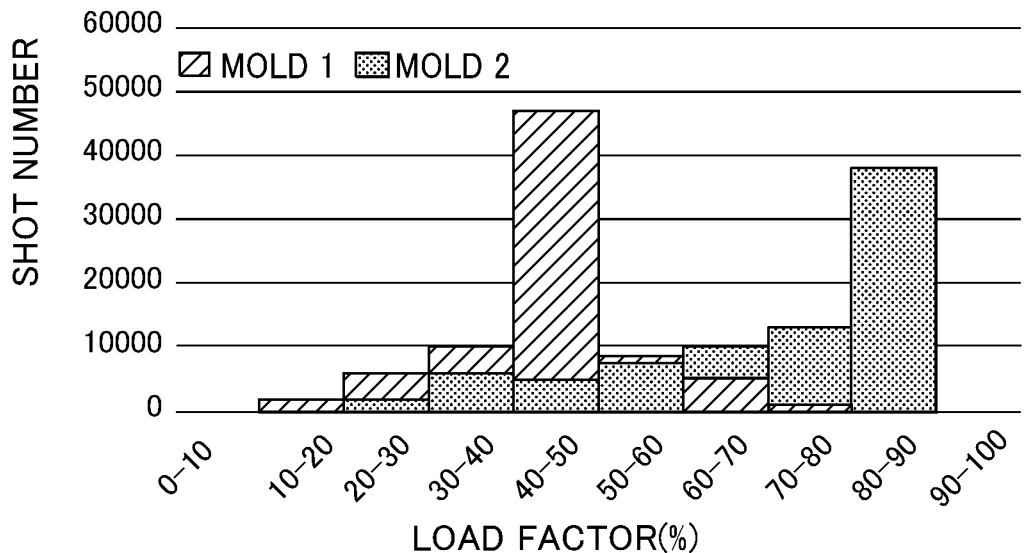
FIG. 8 is a graph showing one example where histograms showing the load factor for each of multiple molds are displayed with the histograms overlapping with each other.

FIG. 8 shows an example where the output control unit 714 displays, on the display unit 75, the histograms indicating the distribution of the motor load factors for the multiple molds with these histograms overlapping with each other. By such displaying in an overlapping state as described above, the user can efficiently and easily compare, as a difference, the distribution of the motor load factor in the case of using the mold 1 and the distribution of the motor load factor in the case of using the mold 2. Note that the output control unit 714 is not limited to two different molds in the case of displaying the histograms with the histograms overlapping with each other as described above. The output control unit 714 may display three or more histograms indicating the distribution of the motor load factor in the case of using each of three or more different molds with these histograms overlapping with each other.

Figure 9:
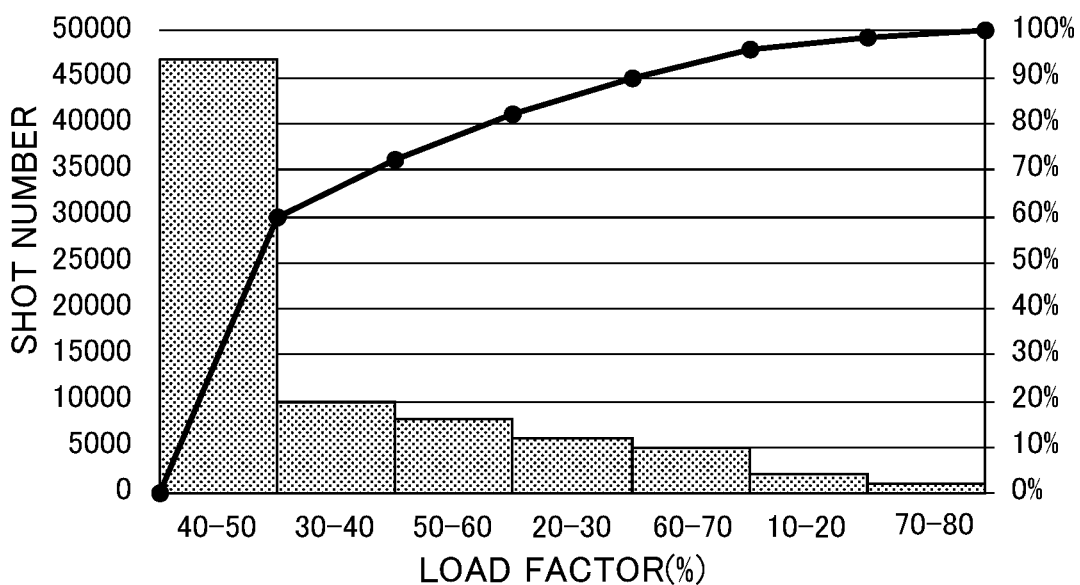
FIG. 9 is a graph showing one example where frequency distribution data is displayed in the form of a Pareto chart.

FIG. 9 is a graph showing one example where the frequency distribution data recorded by the frequency distribution data recording unit 713 is displayed in the form of a Pareto chart. FIG. 9 shows the example where the histogram in which the class data value has been sorted in descending order of frequency based on the frequency distribution data indicating the distribution of the load factor in the case of using the mold 1 as shown in FIG. 7A is displayed on the display unit 75 and the Pareto chart in which a line graph indicating the cumulative relative frequency is displayed on the histogram is output. Referring to FIG. 9, the Pareto chart is displayed so that the user can easily check a machine state data value (e.g., the motor load factor) deviation status in operation of the injection molding machine 1.

<Cumulative Frequency Monitoring Unit 715>

When the frequency distribution data recording unit 713 converts, e.g., the motor load factor into the frequency and records, in the storage unit 72, the frequency at each class for all of the cumulative shot numbers until the latest point of time after shipment of the injection molding machine 1 or for each preset cumulative shot number, the cumulative frequency monitoring unit 715 monitors, based on a threshold for a cumulative frequency set in advance for each class, whether or not the cumulative frequency at least at one class exceeds the threshold set for such a class. In a case where the cumulative frequency at least at one class exceeds the threshold set for such a class, the cumulative frequency monitoring unit 715 issues an alert for prompting, e.g., inspection or component replacement. At this point, when displaying the distribution of the frequency of the motor load factor until, e.g., the latest point of time after shipment of the injection molding machine 1 in the form of a histogram, the output control unit 714 may display the threshold for the cumulative frequency set in advance for each class on the histogram, and in a case where the cumulative frequency at least at one class exceeds the threshold set for such a class, may also display the alert for prompting, e.g., inspection or component replacement.

Figure 10A:
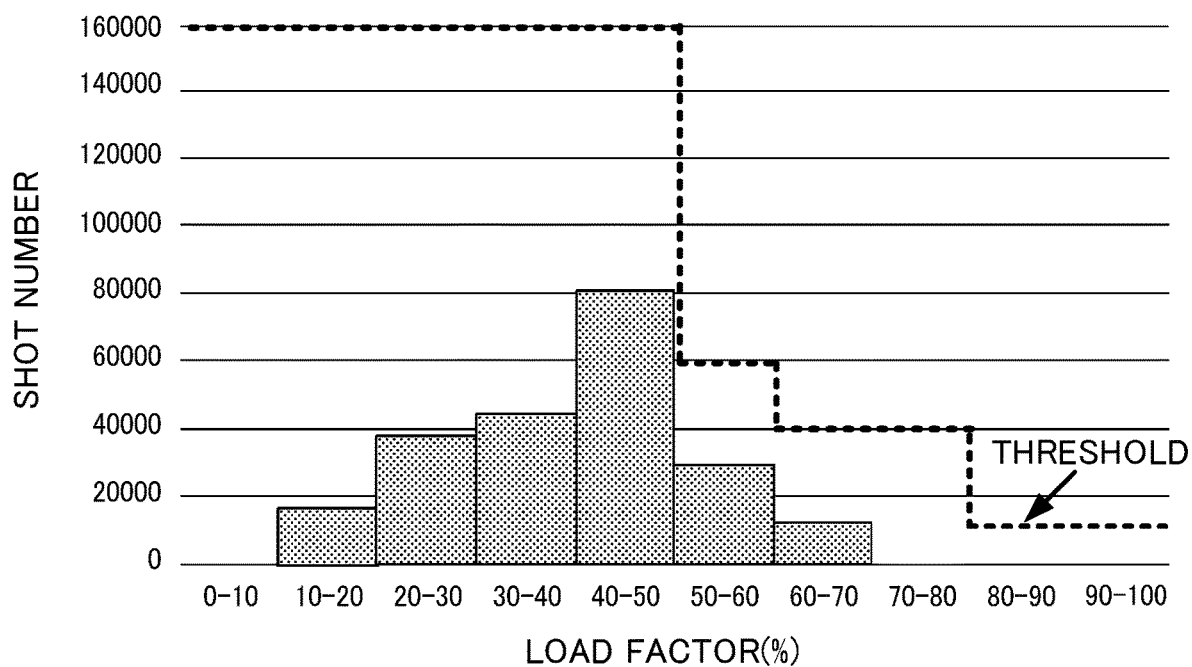
FIG. 10A is a graph showing one example where transition of the motor load factor in a case where a threshold for a cumulative frequency is set in advance for each class in frequency distribution is displayed in the form of a histogram.
Figure 10B:
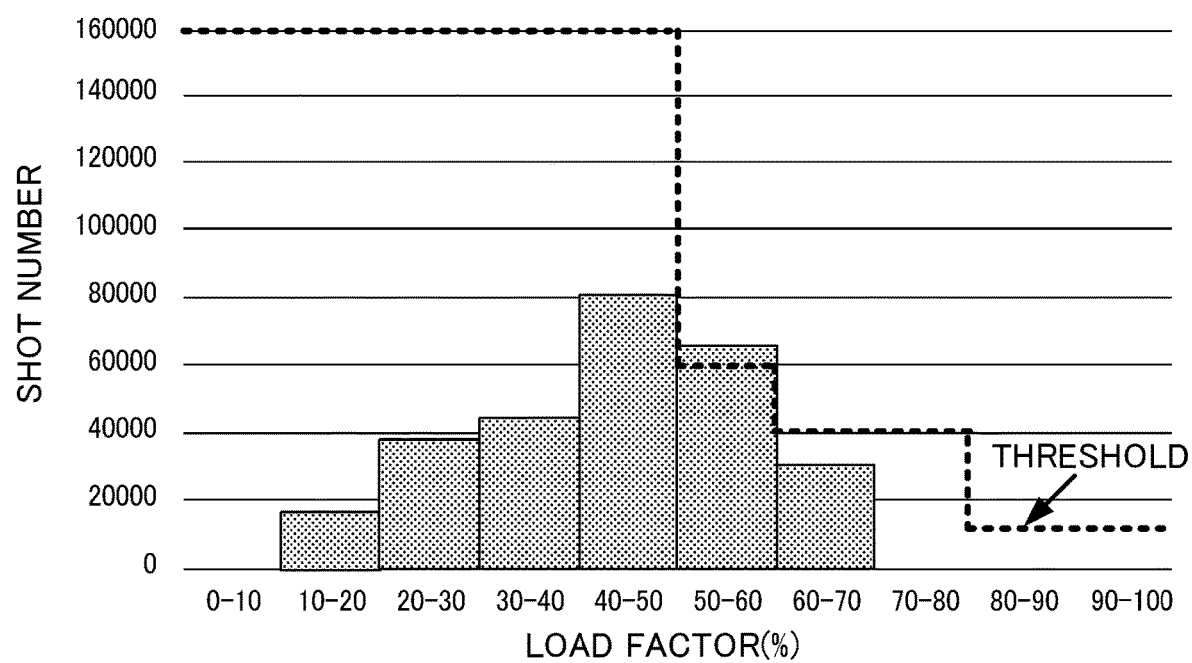
FIG. 10B is a graph showing one example of a displayed histogram in a case where the cumulative frequency exceeds the threshold set in advance for each class in the frequency distribution.

FIGS. 10A and 10B are graphs showing one example where transition of the motor load factor in the case of presetting the threshold for the cumulative frequency for each class is displayed in the form of a histogram. The clamping unit servomotor load factor is described herein as an example of the motor load factor. Referring to FIG. 10A, the threshold for the cumulative frequency is displayed for each class with the threshold overlapping with the histogram. At the point of time as shown in FIG. 10A, the cumulative frequency does not exceed the threshold at any class. In this case, the injection molding machine 1 is determined as normal, and an operator can continuously perform operation. On the other hand, FIG. 10B shows an example where the cumulative frequency exceeds the threshold at the class for a load factor of 50% to 60%. In this case, the output control unit 714 may display, for example, the alert (in this case, e.g., the suggestion of inspecting or replacing the timing belt of the clamping unit) for prompting, e.g., inspection or component replacement for the operator.

In a case where the operator has performed inspection or component replacement, the operator may input such a situation via the input unit 76, and accordingly, the cumulative frequency monitoring unit 715 may update the threshold for the cumulative frequency set for each class. FIG. 10C shows, as an example, the threshold reset after the operator has performed inspection or component replacement. With this configuration, in a case where the operator has performed inspection or component replacement, the operator can continuously perform operation without issuing the above-described alert until the cumulative frequency at each class exceeds the newly-set threshold. One embodiment of the injection molding information management support device 7 has been described above.

Each unit forming the injection molding information management support device 7 can be implemented by hardware (including an electronic circuit, etc.), software, or a combination thereof. In the case of implementing each unit by the software, a program forming this software is installed in the computer (the injection molding machine 1). The program may be distributed to the user with the program being recorded in a removable medium, or may be distributed by download in the user's computer via the network. In the case of implementing each unit by the hardware, some or all of the functions of the units forming the control unit 71 can be implemented by an integrated circuit (IC) such as an application specific integrated circuit (ASIC), a gate array, a field programmable gate array (FPGA), or a complex programmable logic device (CPLD).

The embodiment of the present invention has been described above, but the present invention is not limited to the above-described embodiment. Moreover, the advantageous effects described in the present embodiment are merely the list of most-preferable advantageous effects provided by the present invention, and the advantageous effects by the present invention are not limited to those described in the present embodiment.

Modification Example 1

Figure 11:
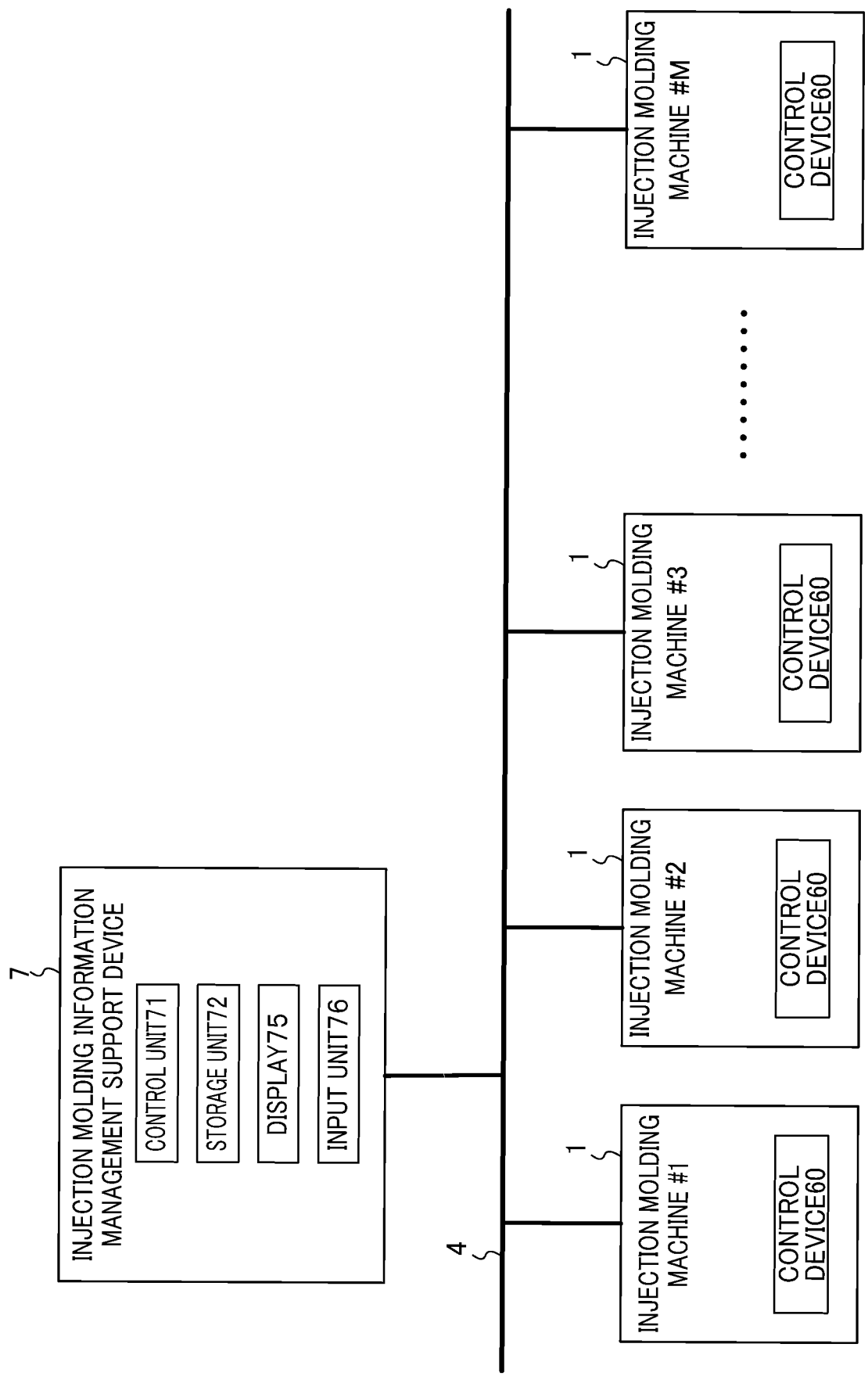
FIG. 11 is a diagram showing the outline of an injection molding information management support device that manages machine state data for one injection molding machine or each of multiple injection molding machines connected to the injection molding information management support device via a network.

In the above-described embodiment, the configuration in which the injection molding information management support device 7 is provided as a device different from the injection molding machine 1 has been described as an example. In this case, the injection molding information management support device 7 may be, as described above, directly connected to the injection molding machine 1 via the interface (not shown). As shown in FIG. 11, the injection molding information management support device 7 may be a server (an injection molding information management support server) communicably connected to the injection molding machines 1 via a network 4. In this case, the injection molding information management support server as the injection molding information management support device 7 may be connected to the multiple injection molding machines #n ($1 \le n \le M$; M is herein an integer of equal to or greater than 2) to manage the machine state data for each of the injection molding machines #n. FIG. 11 is a schematic diagram showing the injection molding information management support device 7 connected via the network 4 to manage the machine state data for the single injection molding machine or each of the multiple injection molding machines. For example, the injection molding information management support device 7 may be an edge server communicably connected to the injection molding machine (an edge). Alternatively, the injection molding information management support device 7 may be implemented as a virtual server on the cloud. Alternatively, the functional units of the injection molding information management support device 7 may be provided as functions on the cloud.

In a case where the injection molding information management support device 7 centrally manages data on the multiple injection molding machines #n ($1 \le n \le M$), the output control unit 714 can display the data for each of the multiple injection molding machines #n in the form of a histogram. Normally, the multiple injection molding machines #n placed in a predetermined area at the same factory often mold the same article, and in the case of molding the same article, the same mold, the same machine specifications, and the same operation condition are often employed. In this case, it is assumed that the distribution of the data obtained from each of the injection molding machines #n tends to show a similar trend. FIGS. 12A and 12B are graphs showing one example where, e.g., the frequency distribution (the same cumulative shot number) of the motor load factor in the multiple injection molding machines #n is displayed. It is assumed that in a case where the injection molding machines #n are installed at the same timing to mold the same article, if each of the injection molding machines #n is normally operated, the frequency distribution for each of the injection molding machines #n shows the same trend as shown in FIG. 12A. On the other hand, as shown in FIG. 12B, if the trend of the frequency distribution (the same cumulative shot number) of the motor load factor in the injection molding machine #2 is different from the trends of the frequency distribution in other injection molding machines #n ($n \ne 2$), the operator can easily determine that there is the probability of some kind of malfunction or failure in the injection molding machine #2. Note that in a case where it is, regarding the trends of the frequency distribution in the multiple injection molding machines #n, determined that the frequency distribution in a specific injection molding machine shows a trend different from those of the frequency distribution in other injection molding machines, the output control unit 714 may notify the operator of the probability of malfunction, etc. in such an injection molding machine.

Modification Example 2

The injection molding machine 1 may include the injection molding information management support device 7. In this case, the control device 60 included in the injection molding machine 1 may include functional blocks (the machine state data acquisition unit 711, the frequency distribution data recording unit 713, and the output control unit 714) included in the control unit 71 of the injection molding information management support device 7. For example, the injection molding information management support device 7 may be the function of the numerical control unit 61. Note that the display 65 may be applied as the display unit 75. Alternatively, it may be configured such that the control device 60 (e.g., the numerical control unit 61) included in the injection molding machine 1 includes some functional units for a management function (the machine state data acquisition unit 711, the frequency distribution data recording unit 713, and the output control unit 714) of the injection molding information management support device 7. In this case, the injection molding machine 1 and the injection molding information management support device 7 including the remaining functional units may be, as described above, directly connected to each other via the interface (not shown). Alternatively, the injection molding machine 1 and the injection molding information management support device 7 may be communicably connected to each other via the network.

<Advantageous Effects of Present Embodiment>

According to the present embodiment, the following features and advantageous effects are provided, for example.

(1) An injection molding information management support device 7 for managing machine state data regarding a machine state in operation of an injection molding machine 1 during a predetermined period and/or in every predetermined period includes an accessibly-connected storage unit 72 and a control unit 71. The control unit 71 includes a machine state data acquisition unit 711 that acquires a machine state data value for each molding cycle in the injection molding machine 1, and a frequency distribution data recording unit 713 that converts the machine state data value acquired by the machine state data acquisition unit 711 into a class data value indicating the preset class of the machine state data value and records a frequency during the predetermined period and/or in every predetermined period in the storage unit 72. With this configuration, a changing trend of the machine state data regarding the machine state in operation of the injection molding machine 1 during the predetermined period and/or in every predetermined period and a singular value such as an unexpected error can be efficiently recorded. That is, the frequency for the class is updated. Thus, as compared to the case of saving an operation data value for each injection molding cycle, a data amount to be saved per cycle is smaller, and longer-term operation data can be saved. Moreover, unlike a method in which an average value of the operation data value is saved, an abnormal operation data value as the singular value can be also saved.

(2) In the injection molding information management support device 7 according to (1), the machine state data value may be information that includes at least any of the load factor of each drive unit of the injection molding machine, a peak pressure, clamping force, the temperature of each drive unit, cycle time, injection time, and measurement time and that is obtained in cycle operation of the injection molding machine. With this configuration, long-term operation data on each mechanism in operation of the injection molding machine 1 can be saved, for example.

(3) In the injection molding information management support device 7 according to (1) or (2), the frequency distribution data recording unit 713 may further categorize the class data value converted from the machine state data value based on a preset condition, produce categorical frequency distribution data for each category based on the group of categorized class data values, and record the categorical frequency distribution data. With this configuration, the changing trend of the machine state data regarding the machine state in operation of the injection molding machine 1 during the predetermined period and/or in every predetermined period and the presence or absence of the singular value can be efficiently recorded for each preset category, for example.

(4) The condition according to (3) may include, regarding a molding cycle according to the machine state data value, at least any of a mold used in injection molding, a molding condition, the range of a cumulative shot number, and a molding period. With this configuration, in, e.g., the case of performing injection molding with a target mold, the changing trend of the machine state data regarding the machine state in operation of the injection molding machine 1 and the presence or absence of the singular value can be efficiently recorded for each mold, for example.

(5) In the injection molding information management support device 7 according to any one of (1) to (4), the frequency distribution data recording unit 713 may further delete, after having recorded the frequency in the storage unit 72, the machine state data value for each molding cycle in the injection molding machine 1, the machine state data value being acquired by the machine state data acquisition unit 711. With this configuration, a data amount for storing the machine state data value for each molding cycle in the injection molding machine 1 can be reduced.

(6) The injection molding information management support device 7 according to any one of (1) to (5) further includes a cumulative frequency monitoring unit 715. When the frequency distribution data recording unit 713 converts the machine state data value acquired by the machine state data acquisition unit 711 into the class data value indicating the preset class of the machine state data value and records the frequency during the predetermined period and/or in every predetermined period in the storage unit 72, the cumulative frequency monitoring unit 715 may monitor, based on a threshold for a cumulative frequency set in advance for each class, whether or not the cumulative frequency at least at one class exceeds the threshold set for such a class. With this configuration, an operation state can be easily monitored according to the type and class of data.

(7) The injection molding information management support device 7 according to any one of (1) to (6) further includes a display unit 75 and an output control unit 714. The output control unit 714 may output, to the display unit 75, frequency distribution based on the class data value recorded in the storage unit 72 in the form of a histogram, and/or may sort the class data value converted from the machine state data value in descending order of frequency and output, to the display unit 75, data with a Pareto chart in which a line graph of a cumulative relative frequency is on the histogram. With this configuration, deviation of the machine state data value in operation of the injection molding machine 1 can be easily checked, for example. That is, the frequency distribution is displayed using, e.g., the histogram or the Pareto chart, and therefore, the presence or absence of the singular value and the distribution of the operation data can be easily grasped, for example. Specifically, the presence or absence of the singular value is data useful for investigating the cause for malfunction of the injection molding machine.

(8) The output control unit 714 according to (7) may output a file as the output data. With this configuration, the advantageous effects similar to those of (7) can be provided.

(9) In the injection molding information management support device 7 according to (7) or (8), the output control unit 714 may display histograms generated for each category on the display unit 75 with the histograms overlapping with each other, or may display the histograms next to each other. With this configuration, the user can efficiently and easily compare, as a difference, motor load factor distribution in a certain category and motor load factor distribution in another category, for example.

(10) The injection molding information management support device 7 according to any one of (1) to (9) may be communicably connected to one or more injection molding machines 1, and may manage the machine state data for each of the one or more injection molding machines 1. With this configuration, the changing trend of the machine state data regarding the machine state in operation of each of the one or more injection molding machines 1 during the predetermined period and/or in every predetermined period and the singular value such as an unexpected error can be centrally managed.

(11) In the injection molding information management support device 7 according to (10), in a case where the injection molding machines 1 perform molding with the same mold and the same machine specifications under the same identical operation condition, the probability of occurrence of failure in each injection molding machine 1 can be determined based on the frequency distribution obtained from each injection molding machine 1. With this configuration, in a case where the multiple injection molding machines mold the same article, if there is a deviation in the frequency distribution acquired from each injection molding machine, such a deviation can be grasped as a sign of malfunction, etc. of the injection molding machine.

(12) An injection molding machine 1 may include the injection molding information management support device 7 according to any one of (1) to (11). With this configuration, the advantageous effects similar to those of (1) to (11) can be provided.

EXPLANATION OF REFERENCE NUMERALS 1 injection molding machine
10 clamping unit
12 stationary platen
13 moving platen
14 eject pin
15 rear platen
20 toggle mechanism
21 clamping servomotor
21a position/speed detector
21b clamping servo-amplifier
30 mold
32 stationary-side mold
33 moving-side mold
36 bus
40 injection unit
41 injection cylinder
42 nozzle portion
43 injection screw
45 measuring servomotor
45a position/speed detector
45b measuring servo-amplifier
46 injection servomotor
46a position/speed detector
46b injection servo-amplifier
47 pressure sensor
48 hopper
50 ejector mechanism
51 ejector servomotor
51a position/speed detector
51b ejector servo-amplifier
60 control device
61 numerical control unit
611 numerical control CPU
612 storage unit
62 PLC
621 PLCCPU
622 storage unit
63 servo-control unit
631 servo-control CPU
632 storage unit
65 display
7 injection molding information management support device
71 control unit
711 machine state data acquisition unit
713 frequency distribution data recording unit
714 output control unit
715 cumulative frequency monitoring unit
72 storage unit
75 display unit
76 input unit

What is claimed is:

1. An injection molding information management support device for separating a long-term operation period in every predetermined period by a range of a cumulative shot number or a range of a molding date and time, and managing machine state data regarding a machine state in operation of an injection molding machine during the predetermined period and/or in the every predetermined period, comprising:
an accessibly-connected storage unit; and
a control unit,
wherein the control unit includes
a machine state data acquisition unit that acquires a molding data value obtained by measuring machine state data regarding a machine state in operation of the injection molding machine by an optional measuring instrument as a machine state data value for each of molding cycles in each step constituting the molding cycles in the injection molding machine, and
a frequency distribution data recording unit that converts the machine state data value acquired by the machine state data acquisition unit into a class data value indicating to which class the machine state data value corresponds based on a class of the machine state data value that is set by separating a possible range of the machine state data value into a plurality of classes in advance, associates the class data value with the predetermined period to which a molding date and time when the machine state data value has been acquired belongs, and updates a frequency corresponding to the class data value during the predetermined period and/or in the every predetermined period in a manner lined with identification information on a mold used in a molding operation, and records the frequency in the storage unit, so that a changing trend of the machine state data regarding the machine state in operation of the injection molding machine during the predetermined period and/or in the every predetermined period included in the long-term operation period and a singular value in case of an unexpected error can be efficiently recorded.

2. The injection molding information management support device according to claim 1, wherein the machine state data value is information that includes at least any of a load factor of each drive unit of the injection molding machine, a peak pressure, clamping force, a temperature of each drive unit, cycle time, injection time, and measurement time and that is obtained in cycle operation of the injection molding machine.

3. The injection molding information management support device according to claim 1, wherein
the frequency distribution data recording unit further categorizes the class data value converted from the machine state data value based on a preset condition regarding the class data value, produces categorical frequency distribution data for each category based on a group of categorized class data values, and records the categorical frequency distribution data.

4. The injection molding information management support device according to claim 3, wherein the condition includes, regarding a molding cycle according to the machine state data value, at least any of a same mold being used in injection molding, a molding condition, a range of a cumulative shot number, and a molding period.

5. The injection molding information management support device according to claim 1, wherein
the frequency distribution data recording unit further deletes, after having recorded the frequency in the storage unit, the machine state data value for each molding cycle in the injection molding machine, the machine state data value being acquired by the machine state data acquisition unit.

6. The injection molding information management support device according to claim 1, further comprising:
a cumulative frequency monitoring unit,
wherein when the frequency distribution data recording unit converts the machine state data value acquired by the machine state data acquisition unit into the class data value indicating the preset class of the machine state data value and records the frequency during the predetermined period and/or in every predetermined period in the storage unit, the cumulative frequency monitoring unit
monitors, based on a threshold for a cumulative frequency set in advance for each class, whether or not the cumulative frequency at least at one class exceeds the threshold set for the one class.

7. The injection molding information management support device according to claim 1, further comprising:
a display unit; and
an output control unit,
wherein the output control unit
outputs, to the display unit, frequency distribution based on the class data value recorded in the storage unit in a form of a histogram, and/or
sorts the class data value converted from the machine state data value in descending order of frequency and outputs, to the display unit, data with a Pareto chart in which a line graph of a cumulative relative frequency is on the histogram.

8. The injection molding information management support device according to claim 7, wherein the output control unit outputs a file as the output data.

9. The injection molding information management support device according to claim 7, wherein
the frequency distribution data recording unit further categorizes the class data value converted from the machine state data value based on a preset condition regarding the class data value, produces categorical frequency distribution data for each category based on a group of categorized class data values, and records the categorical frequency distribution data, and
wherein the output control unit displays histograms generated for each of the categories on the display unit with the histograms overlapping with each other, or displays the histograms next to each other.

10. The injection molding information management support device according to claim 1, wherein
the injection molding information management support device is communicably connected to one or more injection molding machines, and
manages the machine state data for each of the one or more injection molding machines.

11. The injection molding information management support device according to claim 10, wherein in a case where the injection molding machines perform molding with an identical mold and an identical machine specification under an identical operation condition, a probability of occurrence of failure in each injection molding machine is determined based on the frequency distribution obtained from each injection molding machine.

12. An injection molding machine comprising: the injection molding information management support device according to claim 1.

\* \* \* \* \*